United States Patent [19]
Nishio

[11] Patent Number: 5,675,834
[45] Date of Patent: Oct. 7, 1997

[54] CAMERA USING FILM CARTRIDGE WITH MOVABLE LIGHT SHIELDING DOOR

[75] Inventor: Tetsuya Nishio, Kawasaki, Japan

[73] Assignee: Canon Kabushiki Kaisha, Tokyo, Japan

[21] Appl. No.: 266,581

[22] Filed: Jun. 28, 1994

[30] Foreign Application Priority Data

Jun. 30, 1993 [JP] Japan .................... 5-183237

[51] Int. Cl.⁶ .................... G03B 19/10; G03B 17/26; G03B 17/02; G03B 17/24
[52] U.S. Cl. .................... 396/310; 396/311; 396/535; 396/516
[58] Field of Search .................... 354/173.1, 212, 354/106, 275, 289.1, 289.11, 215; 396/311, 535, 516, 310

[56] References Cited

U.S. PATENT DOCUMENTS 5,200,777  4/1993  Zander .................... 354/275

FOREIGN PATENT DOCUMENTS 2-181141   7/1990  Japan .
4304437   10/1992  Japan .
4-365033  12/1992  Japan .

OTHER PUBLICATIONS

Patent Abstracts of Japan, vol. 14, No. 452 (P-1112) Sep. 27, 1990.

Patent Abstracts of Japan, vol. 17, No. 242 (P-1535) May 14, 1993.

Patent Abstracts of Japan, vol. 17, No. 118 (P-1500) Mar. 11, 1993.

*Primary Examiner*—Safet Metjahic
*Assistant Examiner*—Daniel Chapik
*Attorney, Agent, or Firm*—Fitzpatrick, Cella, Harper & Scinto

[57] ABSTRACT

A camera, an apparatus, or a device applied thereto which uses an image recording medium cartridge having a cover for allowing an image recording medium to come out from or in the image recording medium cartridge, has determination means for determining at least one of a state wherein the cover of the cartridge loaded in the camera or apparatus allows entrance of light into the cartridge and a state wherein the cover of the cartridge clamps the image recording medium, and regulating means for regulating at least one of recording an image on the image recording medium and obtaining a print of an image recorded on the image recording medium in accordance with a determination result of the determination means.

26 Claims, 20 Drawing Sheets

| FIG. 9A |
| FIG. 9B |
| FIG. 9C |

| FIG. 13A |
| FIG. 13B |
| FIG. 13C |

CAMERA USING FILM CARTRIDGE WITH MOVABLE LIGHT SHIELDING DOOR

BACKGROUND OF THE INVENTION

1. Field of the Invention

The present invention relates to a camera using a film cartridge with a movable light shielding door.

2. Related Background Art

A camera which takes a countermeasure against a case wherein a film is unexpectedly exposed by accidentally opening a back cover during a phototaking operation has been proposed in Japanese Laid-Open Patent Application No. 4-304437.

Conventionally, a film feeding controller for a camera is proposed. In this controller, a film is fed by a first predetermined amount in response to a patrone cover closing operation after a patrone is loaded. Thereafter, when the patrone cover is opened before the film is rewound, the film is wound up by a second predetermined amount corresponding to a film amount exposed by the patrone cover opening operation, in response to a patrone cover closing operation. Furthermore, when the film is wound up by the second predetermined amount, a print inhibition signal is recorded on the frames wound up at that time.

However, the above-mentioned prior art does not disclose at all a case wherein a film cartridge with a movable light shielding door for loading/unloading a film is used.

On the other hand, a conventional camera which uses a film cartridge with a movable light shielding door for loading/unloading a film suffers the following problems.

(1) When the movable light shielding door is closed in a state wherein a film extends from the film cartridge, the film is damaged, and thereafter, when a phototaking operation is performed by opening the film light shielding door again, an image is exposed on the damaged film portion, and cannot be normally taken.

(2) When a cover of a cartridge loading chamber is opened in a state wherein the movable light shielding door of the film cartridge is not completely closed, a film in the film cartridge is exposed, and if a phototaking operation is continued, an image is superposed on an unexpectedly exposed film portion.

SUMMARY OF THE INVENTION

One aspect of the present invention is to provide a camera, an apparatus, or a device applied thereto using an image recording medium cartridge having a cover for loading/unloading an image recording medium, comprising determination means for determining one of a state wherein the cover of the cartridge loaded in the camera or the apparatus allows entrance of light into the cartridge and a state wherein the cover of the cartridge clamps the image recording medium, and regulating means for regulating one of recording of an image on the image recording medium and outputting of a print of the image recorded on the image recording medium in accordance with the determination means, thereby preventing improper image recording and printing.

Other aspects of the present invention will become apparent from the following detailed description of the preferred embodiments.

DETAILED DESCRIPTION OF THE PREFERRED EMBODIMENTS

The preferred embodiments of the present invention will be described hereinafter with reference to the accompanying drawings.

Figure 1:
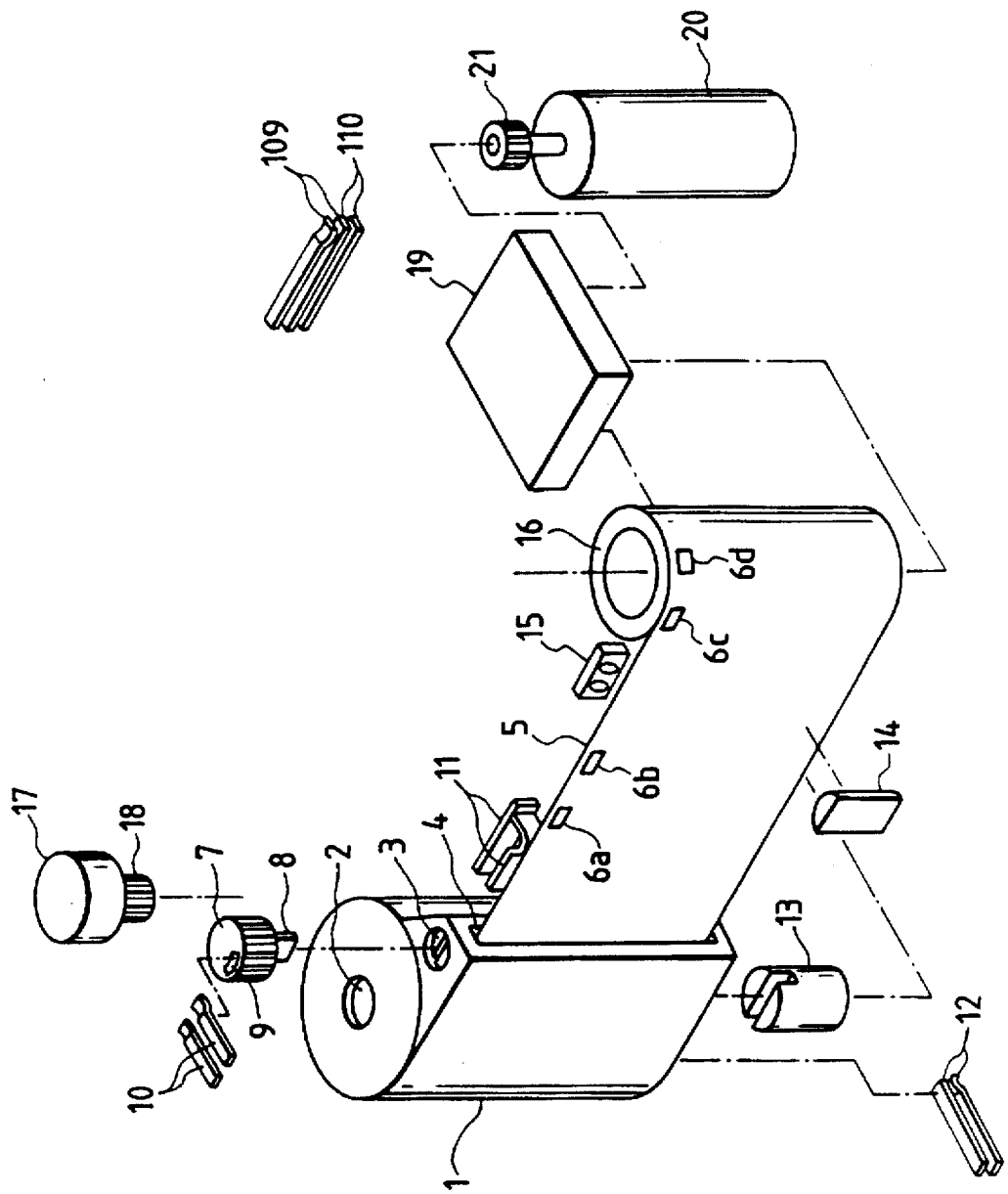
FIG. 1 is a schematic perspective view showing the arrangement of a principal part of a camera according to the first embodiment of the present invention.
Figure 2:
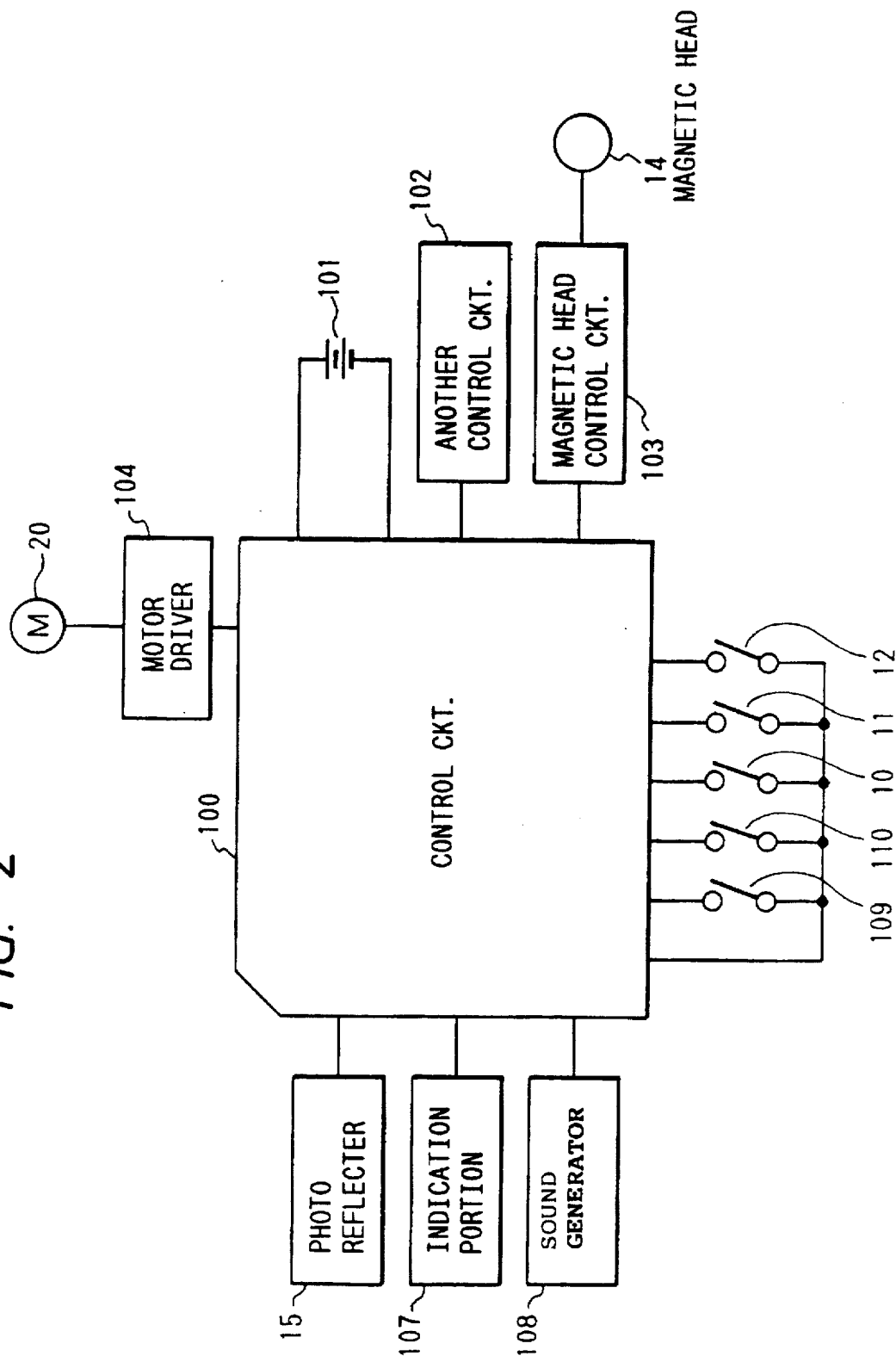
FIG. 2 is a block diagram of the camera shown in FIG. 1.
Figure 3A:
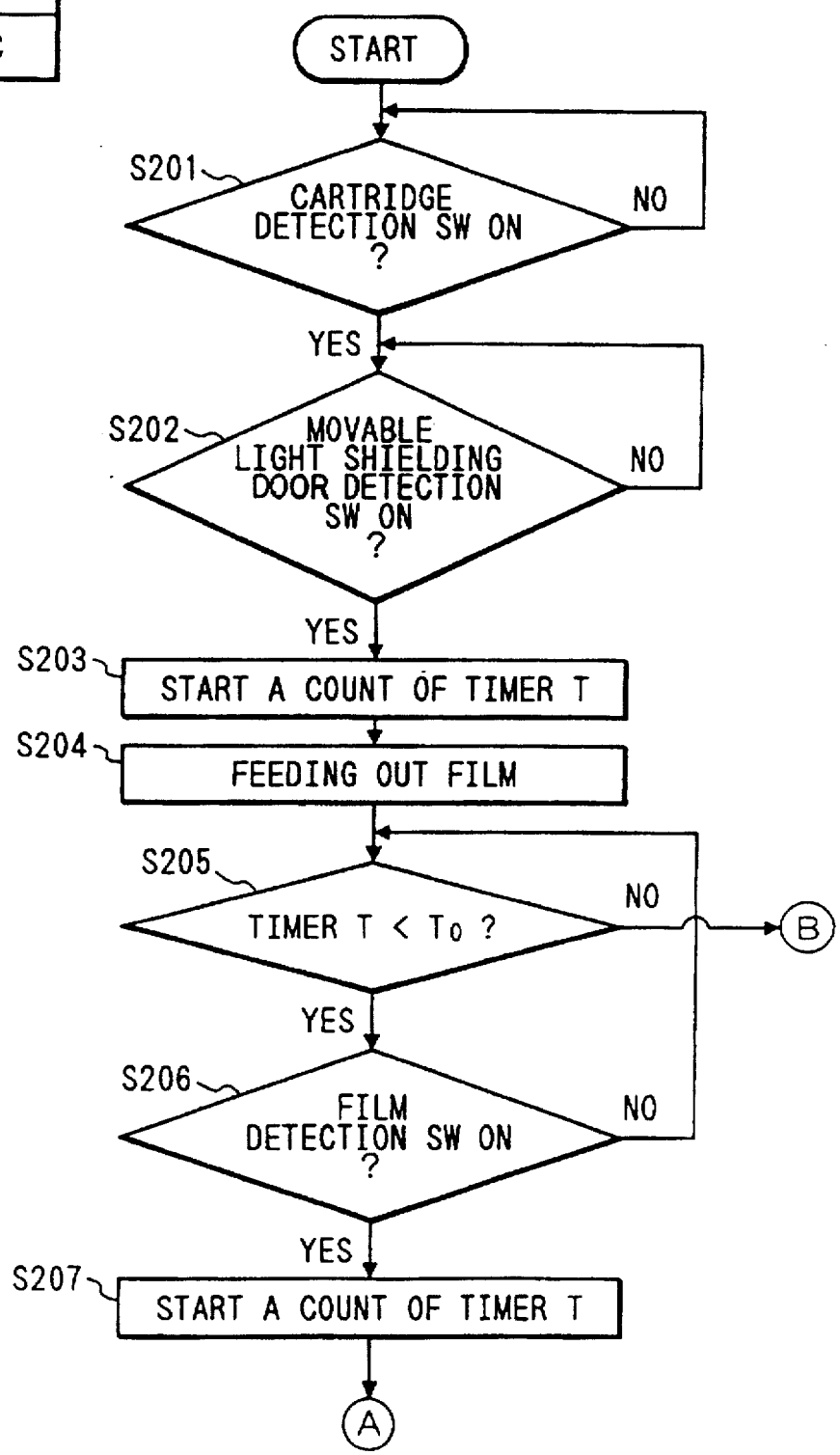
FIG. 3 is comprised of FIGS. 3A, 3B and 3C showing flow charts of a control circuit shown in FIG. 2.
Figure 3B:
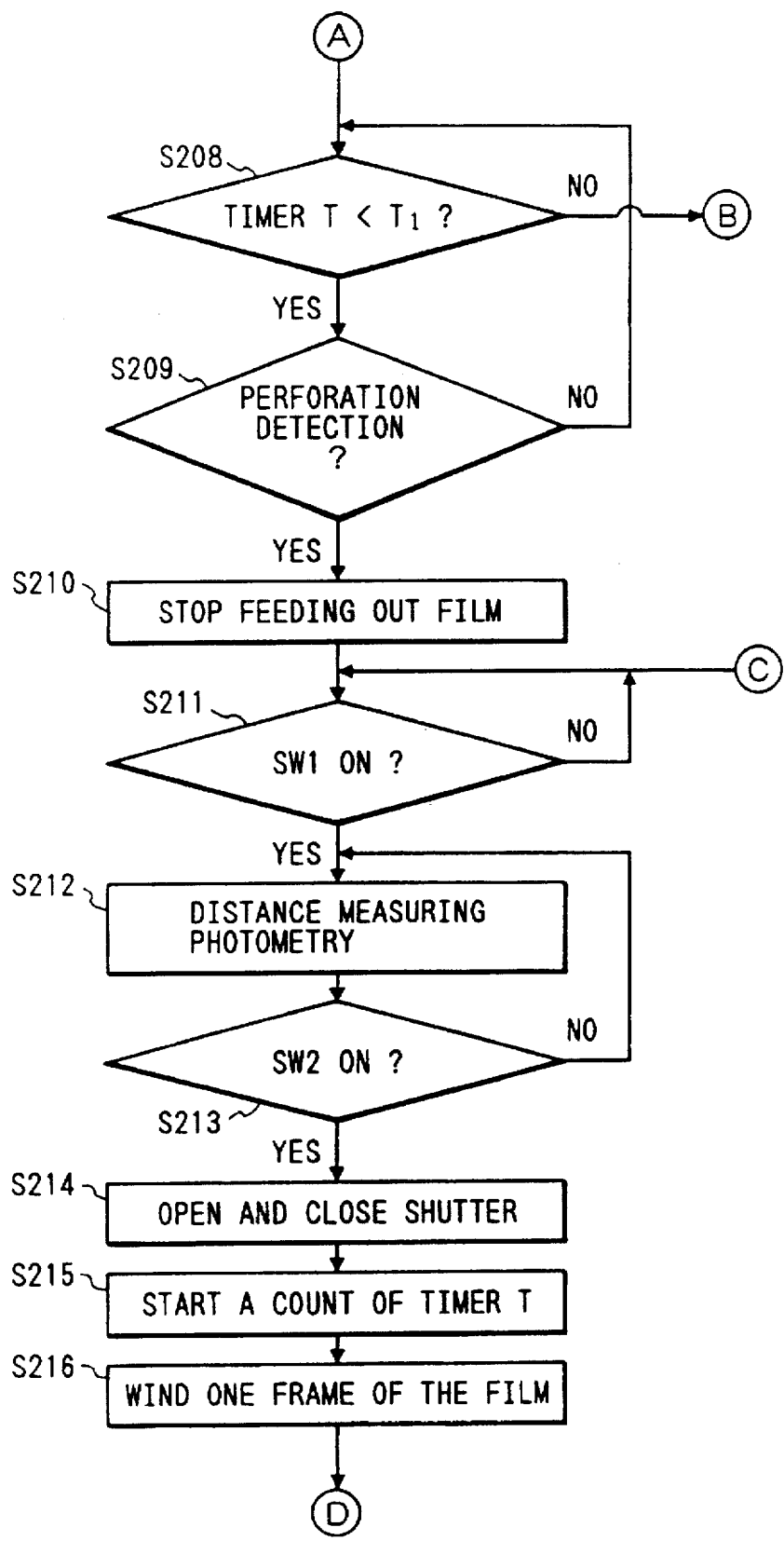
Figure 3C:
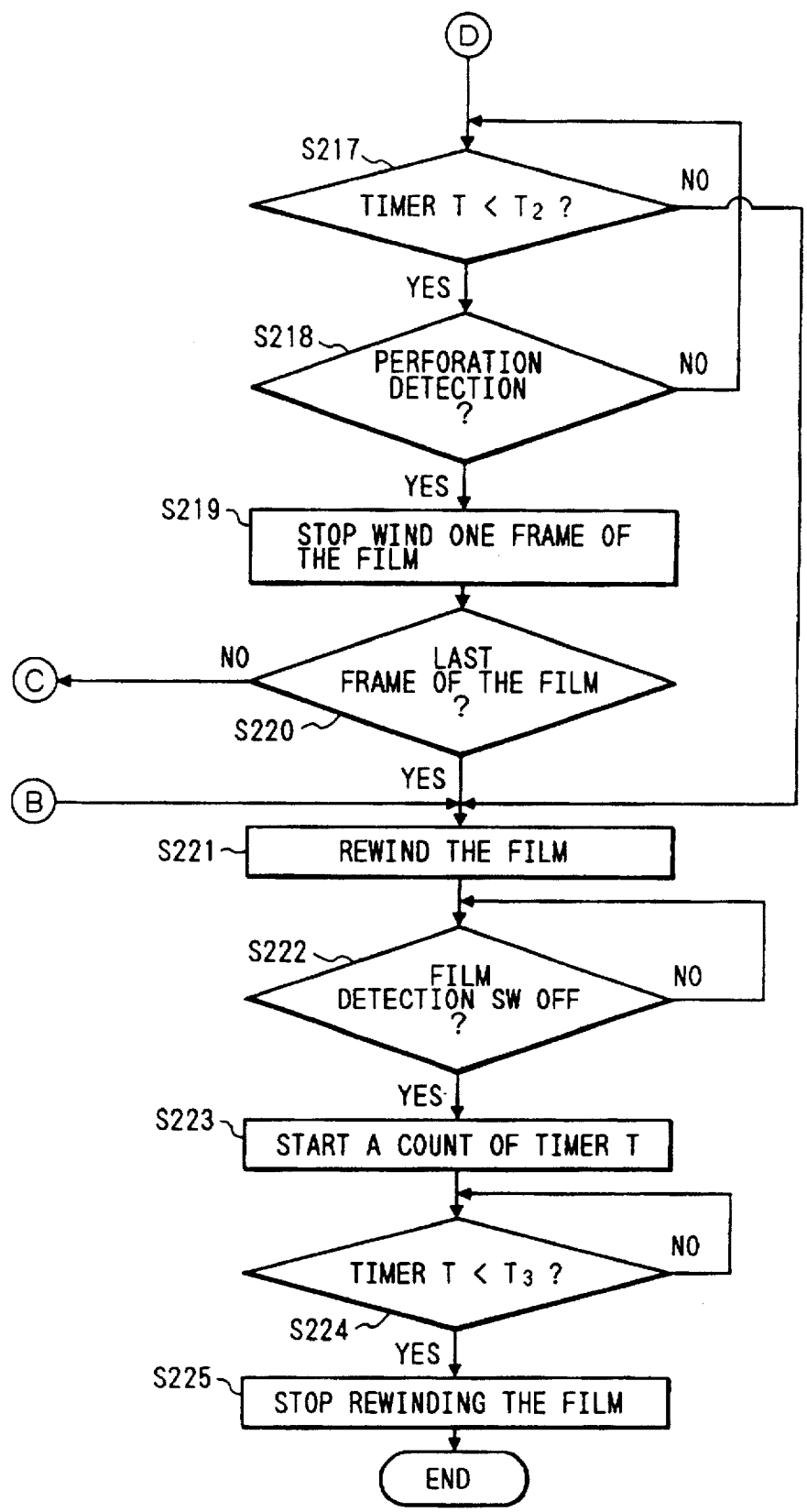

FIGS. 1 to 3C show the first embodiment of the present invention. FIG. 1 is a perspective view of a film feeding controller for a camera, FIG. 2 is a block diagram of the film feeding controller shown in FIG. 1, and FIGS. 3A, 3B, 3C and 4 are flow charts of a control circuit shown in FIG. 2.

Referring to FIG. 1, the camera includes a cartridge 1 for storing a film, a spool shaft 2 of the cartridge 1, which is used for feeding out/rewinding the film, a movable light shielding member opening/closing joint portion 3 of the cartridge 1, a movable light shielding door 4 for opening/closing a film opening of the cartridge 1, a film 5 having perforations 6a, 6b, 6c, and 6d, a driving member 7 for driving the movable light shielding member opening/closing joint portion 3, a joint pawl 8 of the driving member 7, an electrode segment 9 which is arranged on the outer periphery of the driving member 7 to have the rotational shaft of the driving member 7 as the center, and a movable light shielding door opening/closing detection switch 10 which is enabled by the electrode segment 9. Note that FIG. 1 illustrates an open state of the movable light shielding door 4, and in this state, the movable light shielding door opening/closing detection switch 10 is turned on.

The camera also includes a film detection switch 11 for detecting the film extending from the cartridge 1. The switch 11 is enabled by the film 5. FIG. 1 illustrates a state wherein the film 5 extends from the cartridge, and in this state, the film detection switch 11 is turned on. Also, a cartridge detection switch 12 detects if the cartridge 1 is loaded into the camera, and the switch 12 is enabled by the cartridge 1.

In FIG. 1, since the cartridge 1 has been loaded in the camera, the cartridge detection switch 12 is ON.

The camera further includes a power transmission fork 13, which is engaged with the spool shaft 2 of the cartridge 1 and transmits power for feeding out or rewinding the film 5 from or into the cartridge 1, a magnetic head 14 for writing magnetic information on a magnetic recording layer of the film 5 or reading out information written in the magnetic recording layer, a photoreflector 15 for detecting the film 5 and the perforations 6a, 6b, 6c, and 6d, a take-up spool 16 for the film 5, an opening/closing button 17 for the movable light shielding door 4, and a coupling member 18 which is arranged coaxially with the opening/closing button 17. The coupling member 18 meshes with the driving member 7, and upon rotation of the opening/closing button 17, the movable light shielding door 4 is opened/closed via the coupling member 18, the driving member 7, the joint pawl 8, and the joint portion 3. The camera further includes a power transmission means 19 for controlling an operation for feeding out the film 5 from the cartridge 1 and taking up the fed film 5, and an operation for rewinding and storing the film 5 into the cartridge 1, a film feeding motor 20, a gear 21, and switches 109 and 110 which are turned on upon operation of a release button (not shown). The first-stroke switch 109 will be referred to as a switch SW1 hereinafter, and the second-stroke switch 110 will be referred to as a switch SW2 hereinafter.

Referring to FIG. 2, the camera comprises a control circuit 100 constituted by, e.g., a microcomputer, a battery 101, another control circuit 102 for performing distance measuring control, photometry control, and the like, a magnetic head control circuit 103 for reading out and writing information using the magnetic head 14, a motor driver 104 for driving the motor 20, an indication portion 107, and a sound generator 108.

The operation of the above-mentioned arrangement will be described below with reference to the flow charts in FIGS. 3A, 3B, 3C and 4. In step S201, the status of the cartridge detection switch 12 is detected. When the cartridge i is loaded, and the ON state of the switch 12 is detected, the flow advances to step S202. In step S202, the status of the movable light shielding door detection switch 10 is detected. When the opening/closing button 17 is manually rotated in the opening direction, this rotation is transmitted to the coupling member 18 and the driving member 7, and the movable light shielding door 4 is driven in a direction to open via the pawl 8 and the joint portion 3, thus opening the movable light shielding door 4. When the movable light shielding door 4 is opened, the opening/closing button 17 abuts against a stopper (not shown) and cannot be rotated any further.

When the movable light shielding door 4 is opened, the ON state of the movable light shielding door detection switch 10 is detected, a timer counter T in the control circuit 100 starts a count operation (S203), and the motor driver 104 drives the film feeding motor 20 in a direction to feed out the film 5 from the cartridge 1 (S204). Then, upon operation of the power transmission fork 13, the film 5 in the cartridge 1 comes out from the film opening where the movable light shielding door 4 is opened. The fork 13 and the spool 16 have different feeding speeds of the film 5 under the control of the power transmission means 19, so that the spool 16 has a higher feeding speed than that of the fork 13. In addition, since the fork 13 is provided with a unidirectional clutch, when the film 5 is wound around the spool 16, the film 5 is wound up by the spool 16.

On the other hand, it is checked if the value of the timer counter T exceeds a predetermined value $T_0$ (S205). Even if it is determined in step S205 that the value of the timer counter T exceeds the predetermined value $T_0$, if the film detection switch 11 cannot detect the film 5 in step S206, since the feed-out operation of the film 5 from the cartridge 1 is abnormal, the flow advances to step S221 to rewind the film.

If the film detection switch 11 detects the film 5 in step S206 before the value of the timer counter T exceeds the predetermined value $T_0$, the count operation of the timer counter T in the control circuit 100 is restarted (S207). It is then checked if the value of the timer counter T exceeds a predetermined value $T_1$ (S208). Even if it is determined in step S208 that the value of the timer counter T exceeds the predetermined value $T_1$, if the photoreflector 15 cannot detect any perforation of the film 5 in step S209, since the auto-loading operation of the film 5 is abnormal, the flow advances to step S221 to rewind the film.

If the photoreflector 15 detects a perforation of the first frame in step S209 before the value of the timer counter T exceeds the predetermined value $T_1$, the film feeding motor 20 is stopped by the motor driver 104 (S210). Thus, the feeding operation up to the first frame of the film 5 ends.

It is then checked if the switch SW1 (109) is turned on upon operation of the release button (not shown) (S211). If the switch SW1 (109) is turned on, a distance measuring operation, photometry operation, and the like are performed by the other control circuit 102 (S212).

Furthermore, it is checked if the switch SW2 (110) is turned on upon depression of the release button (not shown) (S213). If the switch SW2 (110) is turned on, a shutter (not shown) is opened by the other control circuit 102, and is closed after an elapse of a predetermined period of time (S214). The count operation of the timer counter T in the control circuit 100 is restarted (S215). The motor driver 104 drives the film feeding motor 20 to wind up the film by one frame (S216). It is then checked if the value of the timer counter T exceeds a predetermined value $T_2$ (S217). If it is determined in step S217 that the value of the timer counter T exceeds the predetermined value $T_2$, since the film 5 can no longer be fed out from the cartridge 1 or some abnormality has occurred, the flow advances to step S221 to rewind the film. If the photoreflector 15 detects by means of the perforation that the frame to be exposed on the film 5 advances by one frame in step S218 before the value of the timer counter T exceeds the predetermined value $T_2$, the motor driver 104 stops the film feeding motor 20, thus stopping the operation for winding up the film by one frame (S219).

It is then checked if the number of exposed frames has reached a predetermined value (S220). If it is determined in step S220 that the number of exposed frames has reached the predetermined value, it is determined that all the frames on the film 5 are subjected to phototaking operations, and the flow advances to step S221. Otherwise, the flow advances to step S211 to wait for a phototaking operation. In step S221, the motor driver 104 rotates the film feeding motor 20 in the reverse direction to rotate the fork 13 in the reverse direction via the power transmission means 19, thereby rewinding the film 5 into the cartridge 1. Thereafter, the flow advances to step S222. At this time, the spool 16 is disconnected from the motor 20 by the clutch under the control of the power transmission means 19.

It is checked in step S222 if the film 5 is present at the position of the film detection switch 11. If no film 5 is detected by the switch 11, the flow advances to step S223. The count operation of the timer counter T in the control circuit 100 is restarted (S223). It is then checked if the value of the timer counter T exceeds a predetermined value $T_3$ (S224). If it is determined in step S224 that the value of the timer counter T exceeds the predetermined value $T_3$, the flow advances to step S225. Note that the predetermined value $T_3$ defines a time long enough for the film 5 which has passed the position of the film detection switch 11 to be stored in the cartridge 1. Also, the predetermined value $T_3$ is changed depending on the voltage condition of the battery 101 or the environmental temperature of the camera, so as to prevent wasteful rotation of the motor 20.

In step S225, the motor driver 104 stops the film feeding motor 20.

Thereafter, when the opening/closing button 17 is manually rotated in the closing direction, this rotation is transmitted to the coupling portion 18 and the driving member 7, and the movable light shielding door 4 is driven in a direction to close via the pawl 8 and the joint portion 3.

When the movable light shielding door 4 is closed, the driving member 7 can no longer be rotated any more due to the due to the presence of a stopper (not shown).

Figure 4:
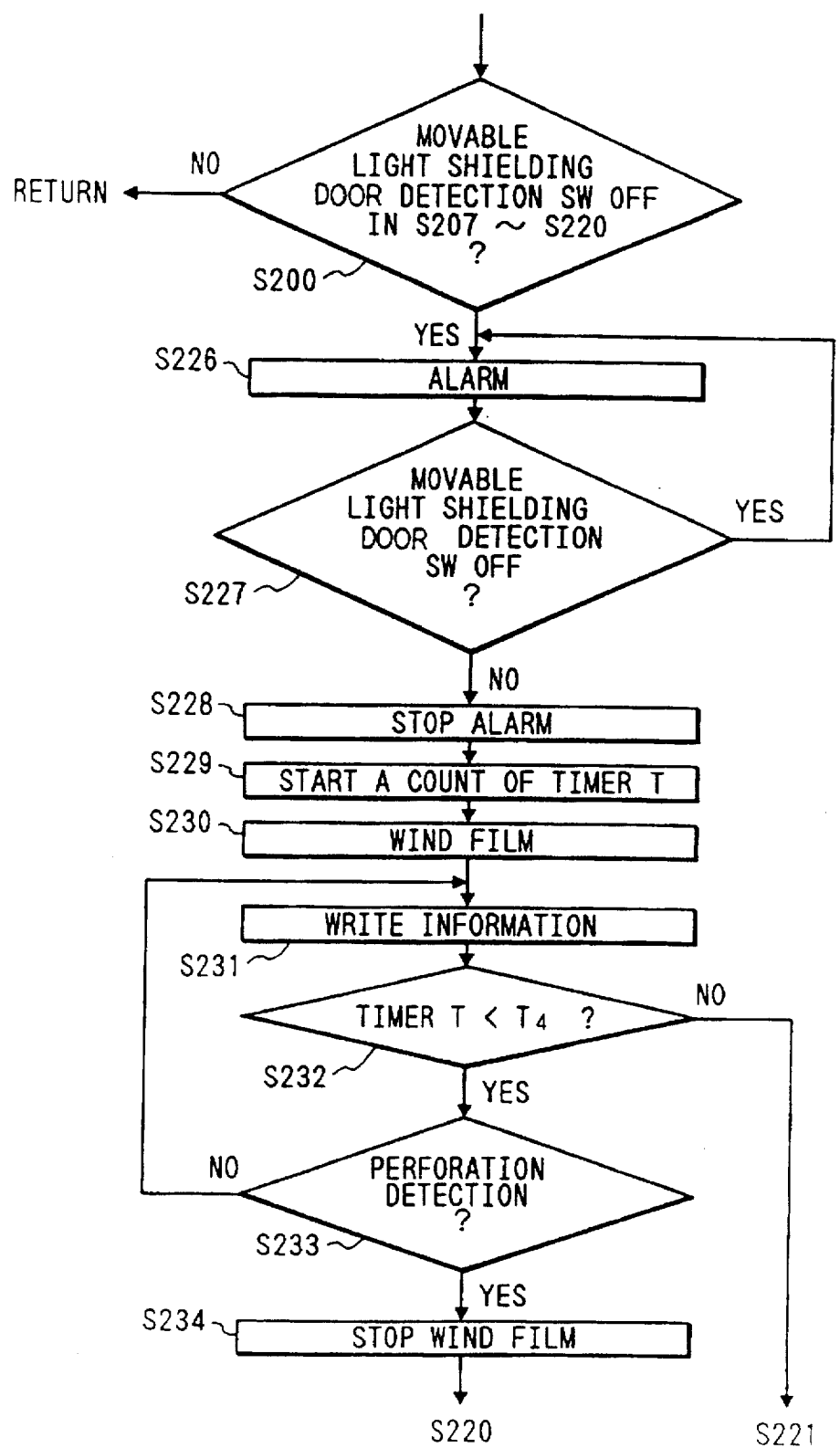
FIG. 4 is a flow chart showing an interrupt routine of the control circuit shown in FIG. 2.

On the other hand, when the opening/closing button 17 is accidentally operated in the closing direction while the film 5 extends from the cartridge 1, the movable light shielding door 4 is closed, and damages the film. In this state, a phototaking operation is undesirably performed on the damaged portion of the film. Thus, when the opening/closing button 17 is accidentally operated in the closing direction to close the movable light shielding door 4 and the movable light shielding door detection switch 10 is turned off during an interval between steps S207 and S220, an interrupt routine shown in FIG. 4 is unconditionally executed (S200).

The interrupt routine will be described below with reference to the flow chart in FIG. 4. The indication portion 107 or the sound generator 108 warns a user of the closing of the movable light shielding door 4 (S226). Thereafter, if the user operates the opening/closing button 17 to open the movable light shielding door 4, and the movable light shielding door detection switch 10 is turned on (S227), the warning operation is stopped (S228).

Then, the count operation of the timer counter T in the control circuit 100 is restarted (S229), and the motor driver 104 drives the film feeding motor 20 to wind up the film (S230). The magnetic head control circuit 103 writes a print inhibition information signal on the magnetic recording portion of the film 5 using the magnetic head 14 (S231). Thus, upon printing, this print inhibition information signal is read to inhibit a frame damaged by the movable light shielding door 4 from being printed. In this manner, an unnecessary print operation can be avoided.

It is then checked if the value of the timer counter T exceeds a predetermined value $T_4$ (S232). If it is determined in step S232 that the value of the timer counter T exceeds the predetermined value $T_4$, since the film 5 can no longer be fed out from the cartridge 1 or some abnormality has occurred, the flow advances to step S221 to rewind the film. On the other hand, if the photoreflector 15 detects that the film 5 is fed by a predetermined amount in step S233 before the value of the timer counter T exceeds the predetermined value $T_4$, the motor driver 104 stops the film feeding motor 20 (S234), and the flow advances to step S220. Note that the predetermined amount corresponds to an amount required for moving the portion, damaged by the movable light shielding door 4, of the film to prevent the portion from being used in a phototaking operation independently of the aperture of the camera (not shown), and need not coincide with an amount for feeding the film by one frame.

With the above-mentioned processing, even when the movable light shielding door 4 is closed while the film extends from the film cartridge, damaging the film, and is opened again later, the damaged film portion can be prevented from being used in a phototaking operation. Furthermore, an unnecessary print operation can be avoided.

Figure 15:
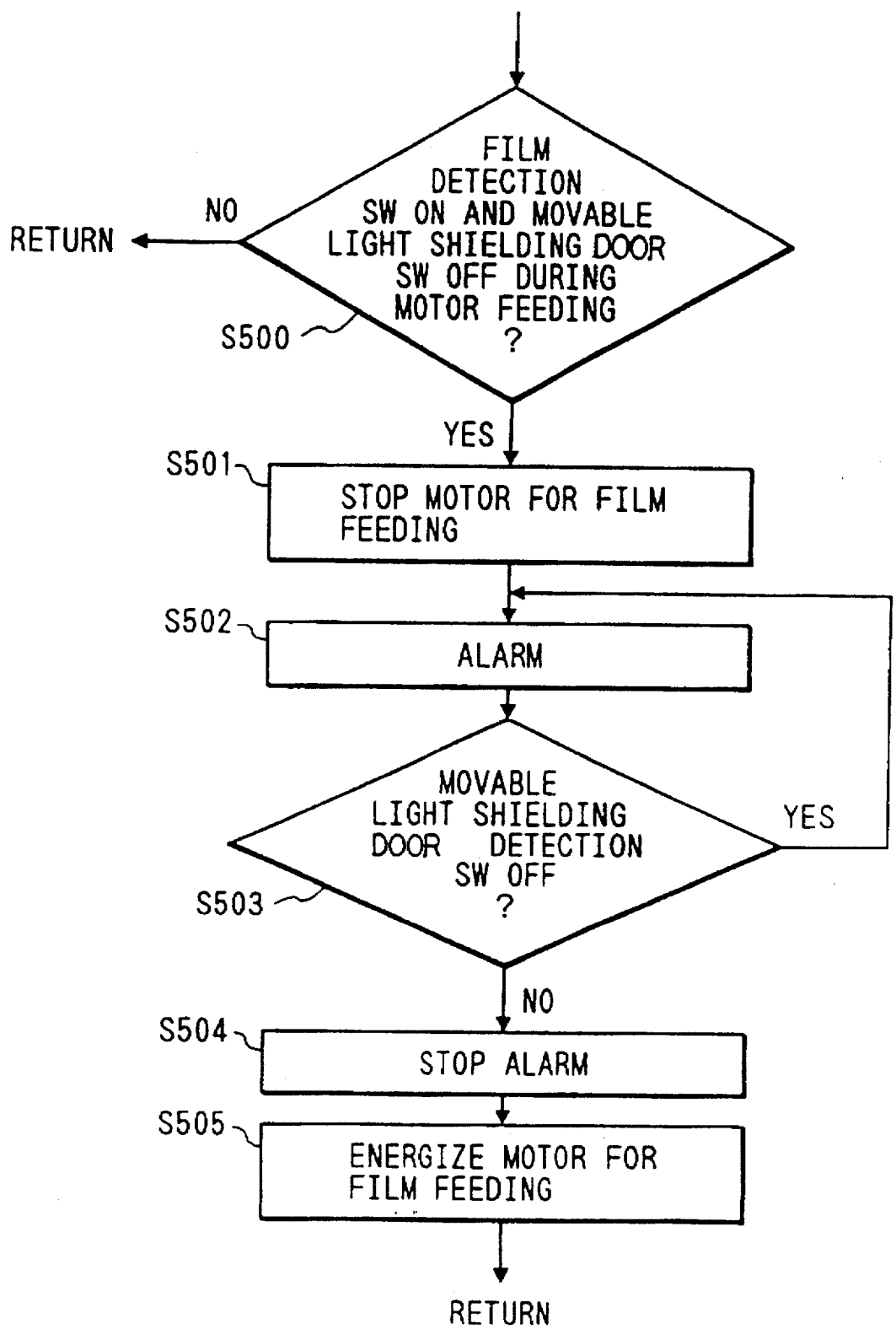
FIG. 15 is a flow chart showing an interrupt routine of the control circuit according to each of the embodiments of the present invention.

Furthermore, when the movable light shielding door 4 is closed while the film 5 extends from the cartridge 1 and the film feeding motor is being rotated (independently of the winding/rewinding operation), the film is damaged. In this case, since the film is moving, the damaged portion is increased in a direction of film movement. Therefore, when the film detection switch 11 is ON, and the film feeding motor 20 is being rotated, if the movable light shielding door detection switch 10 is turned off, an interrupt routine shown in FIG. 15 is executed (S500).

Note that the same applies to the second and third embodiments to be described later. The interrupt routine will be described below with reference to the flow chart in FIG. 15.

In this case, the film feeding motor 20 is immediately stopped (S501). The indication portion 107 or the sound generator 108 warns a user of the closing of the movable light shielding door 4 (S502). Thereafter, when the user operates the opening/closing button 17 (an operation button 27 in the second or third embodiment), and the movable light shielding door detection switch 10 is turned on (S503), the warning operation is stopped (S504), and the film feeding motor 20 is energized again (S505). Thereafter, the flow returns to the previous routine. Note that the rotational direction of the film feeding motor 20 at that time is the same as that before the interrupt routine is started.

With the above-mentioned interrupt routine, even when the movable light shielding door 4 is closed while the film 5 extends from the cartridge 1 and is being wound up or rewound, damaging the film 5, since the movement of the film 5 is stopped at that time, the damaged portion can be prevented from being extended in the direction of due movement of the film.

Figure 5:
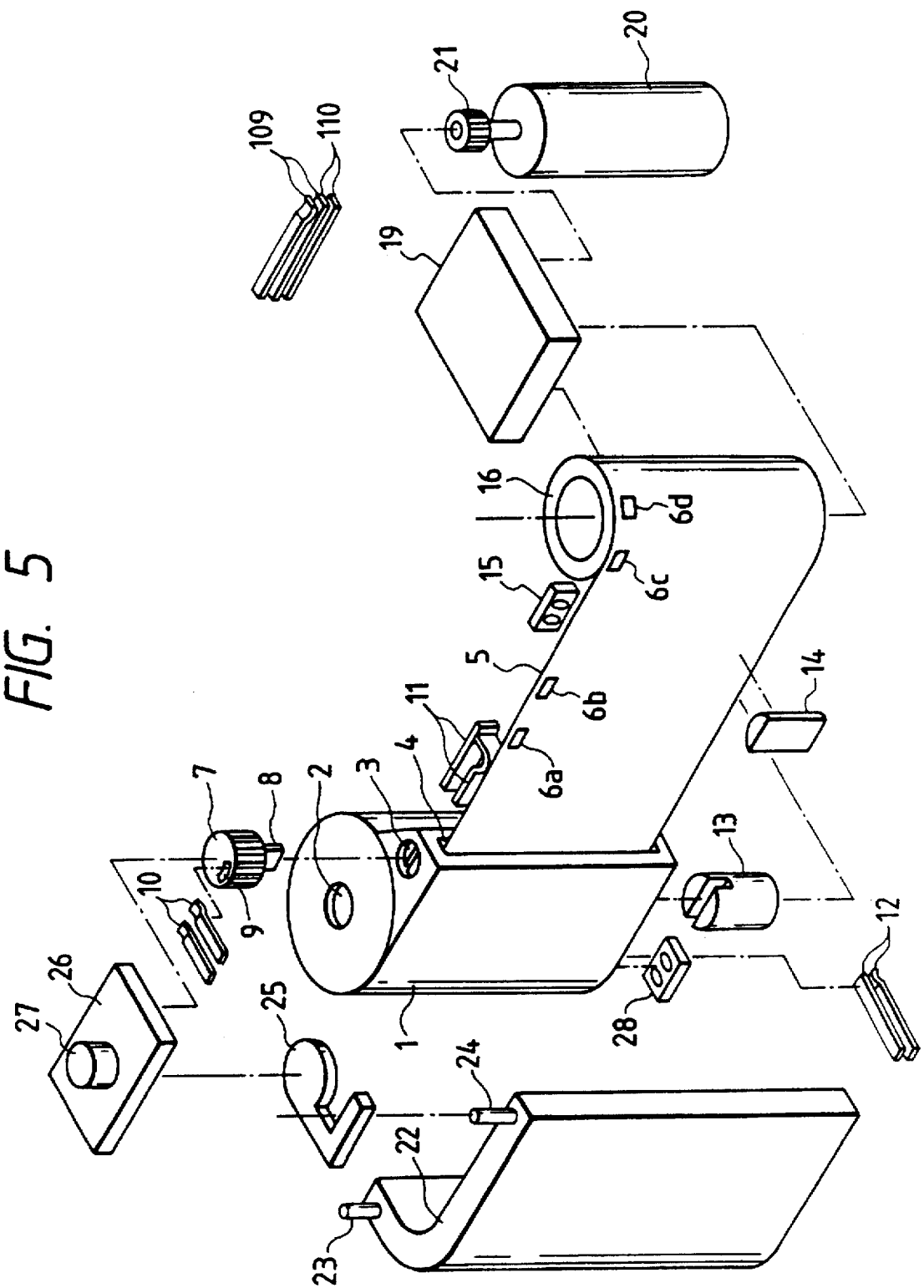
FIG. 5 is a schematic perspective view showing the arrangement of a principal part of a camera according to the second embodiment of the present invention.
Figure 6:
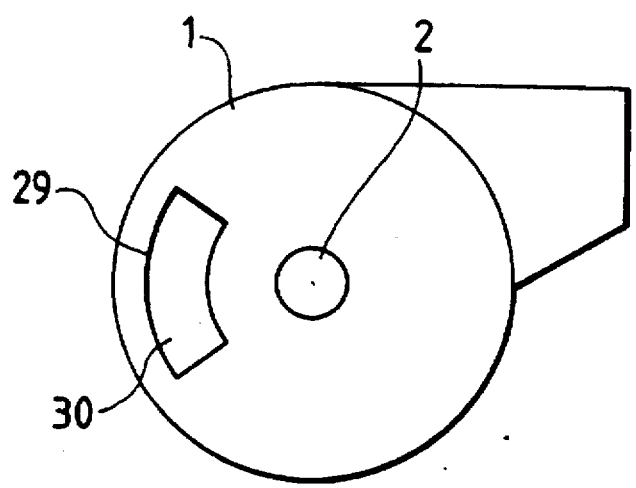
FIG. 6 is a bottom view of a cartridge used in the camera shown in FIG. 5.
Figure 7:
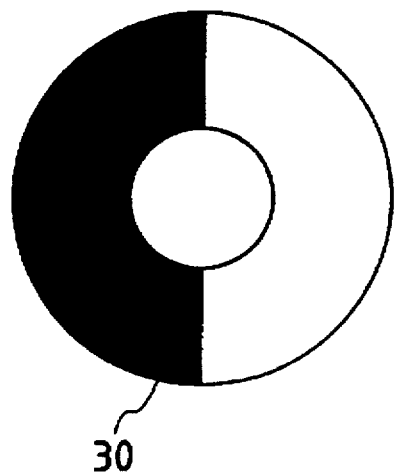
FIG. 7 is a view of a state indication apparatus of the cartridge shown in FIG. 6.
Figure 8:
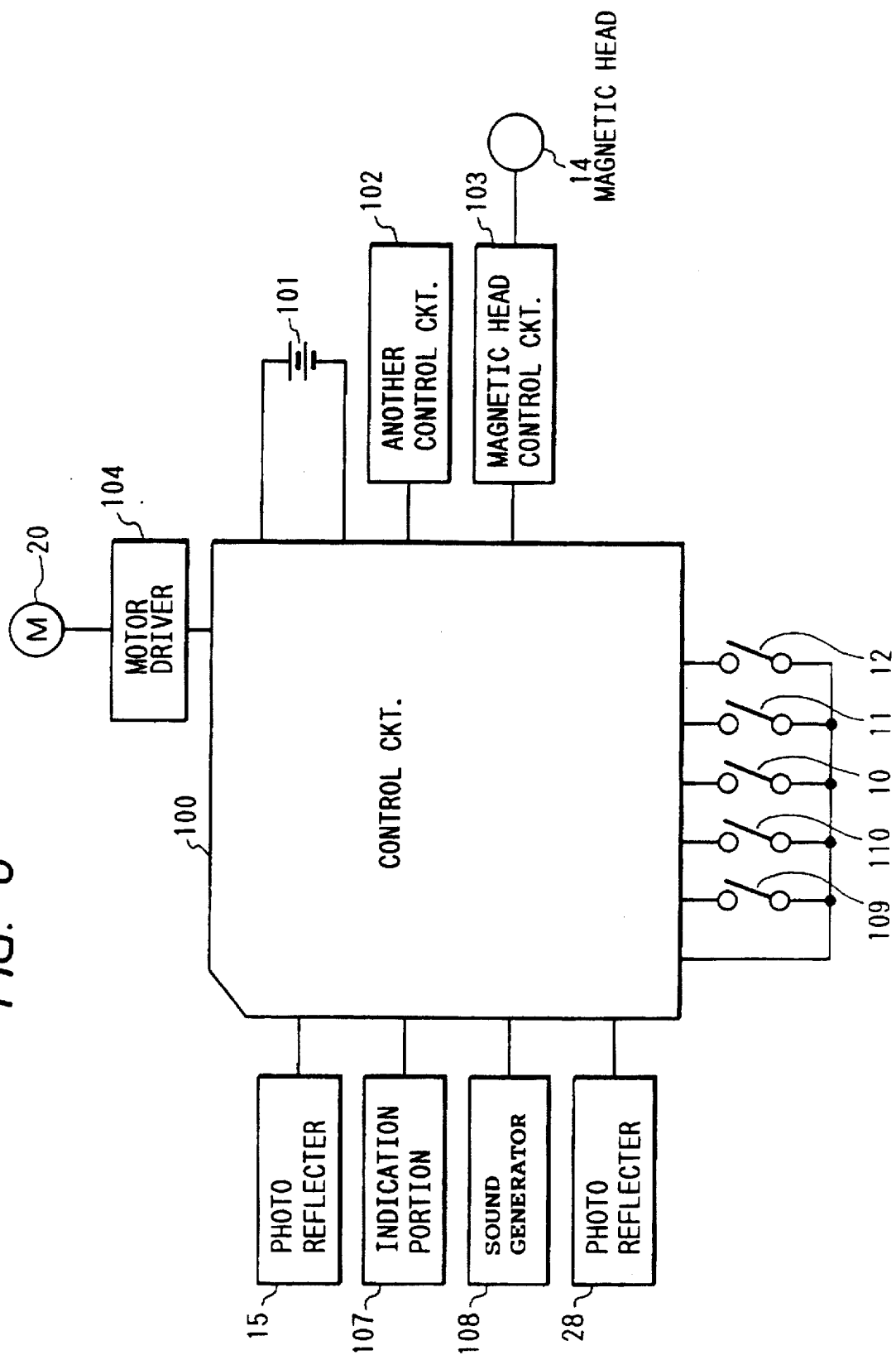
FIG. 8 is a block diagram of the camera shown in FIG. 5.
Figure 9:
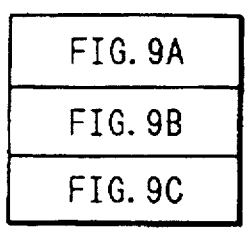
FIG. 9 is comprised of FIGS. 9A, 9B and 9C showing flow charts of a control circuit shown in FIG. 8.
Figure 9A:
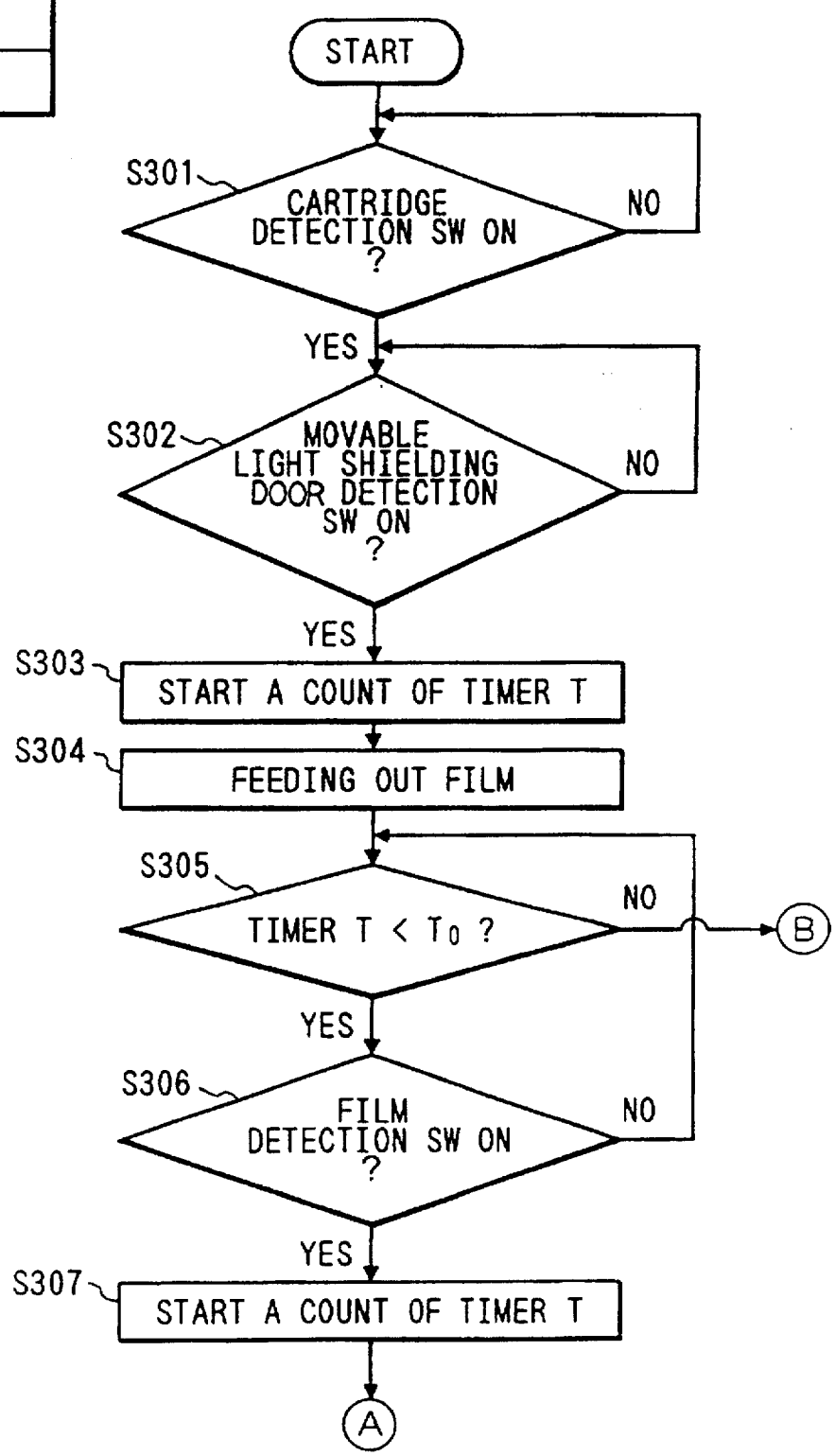
Figure 9B:
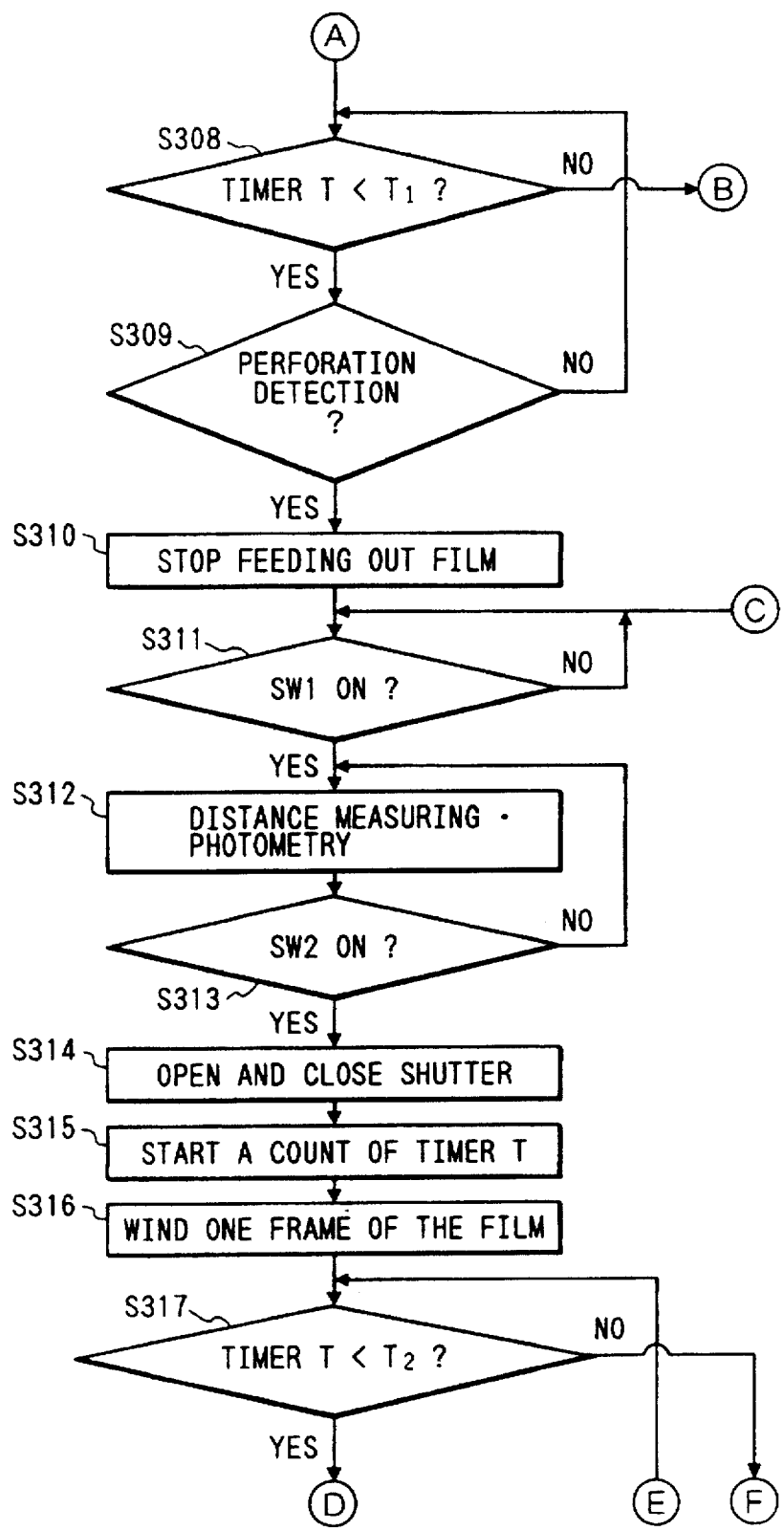
Figure 9C:
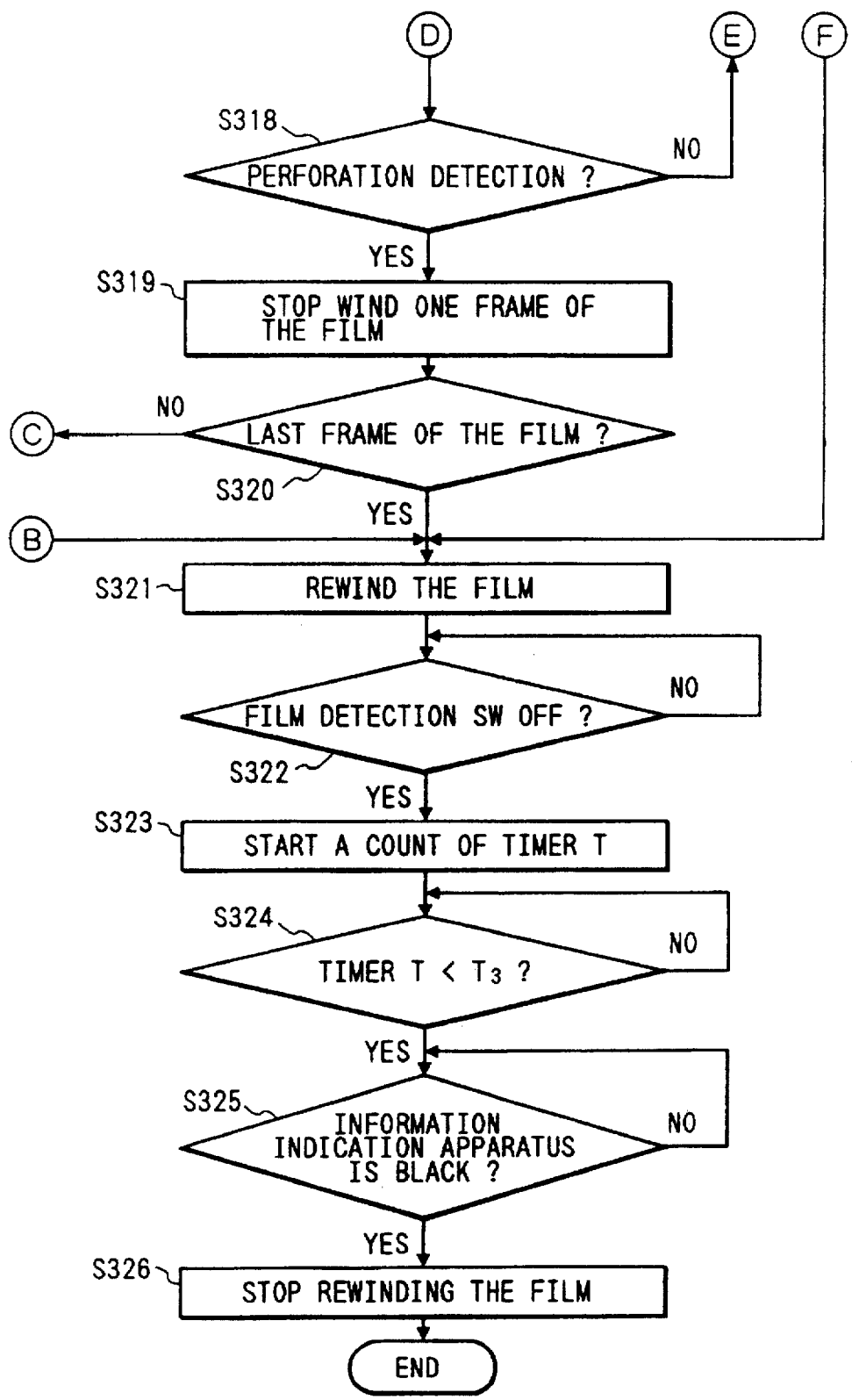

The second embodiment of the present invention will be described below with reference to FIGS. 5 to 10. FIG. 5 is a schematic perspective view showing the arrangement of a principal part of a camera. FIG. 6 is a bottom view of a film cartridge, and FIG. 7 is view showing a status indication apparatus of the film cartridge. FIG. 8 is a block diagram of the camera shown in FIG. 5. Furthermore, FIGS. 9A, 9B, 9C and 10 are flow charts of a control circuit shown in FIG. 8. The same reference numerals in these figures denote the same parts as in the first embodiment, and a detailed description thereof will be omitted.

Referring to FIG. 5, the camera includes a cover 22 of a cartridge loading chamber (to be referred to as a cartridge chamber cover hereinafter), and a hinge shaft 23 of the cartridge chamber cover 22. The cartridge chamber cover 22 is axially and rotatably supported on a camera main body (not shown) via the hinge shaft 23, and is biased in the opening direction by a spring (not shown). The camera also includes a lock pin 24 for the cartridge chamber cover 22, and a lock lever 25 for the cartridge chamber cover 22. FIG. 5 illustrates a state wherein the cartridge chamber cover 22 is closed. In this state, the lock pin 24 is locked by the lock lever 25, and the cartridge chamber cover 22 is locked in the closed state.

When the lock lever 25 is rotated clockwise, the lock lever 25 is unlocked from the lock pin 24, and the cartridge chamber cover 22 is opened by the biasing force of the spring (not shown). The camera further includes an opening/closing device 26 for driving the driving member 7 and the lock lever 25. The opening/closing device 26 serves to open the movable light shielding door 4 when the lock lever 25 is locked, and to close the movable light shielding door 4 when the lock lever 25 is unlocked. Note that the lock lever 25 is not locked unless the cartridge chamber cover is closed by a mechanism (not shown).

The camera further includes an operation button 27. Upon operation of the operation button 27, the opening/closing device 26 operates. A photoreflector 28 is used for reading a status (information) indication apparatus 30 (FIG. 6) of the cartridge 1.

Referring to FIG. 6, the film cartridge 1 has an indication door 29 for the status indication apparatus 30. The status indication apparatus 30 is used for indicating whether the film cartridge is unused or has already been exposed. As shown in FIG. 7, the status indication apparatus 30 has black and white portions, and is fixed to the spool shaft 2 to be rotatable together with the spool shaft 2. When the black portion of the apparatus 30 appears in the indication door 29, it indicates that the film has already been exposed; when the white portion appears in the indication door 29, it indicates that the film is unused. After the film is rewound, when the photoreflector 28 detects the black portion appearing in the indication door 29, the fork 13 is stopped, and the status indication apparatus 30 indicates that the film has already been exposed.

The operation of the above-mentioned arrangement will be described below with reference to the flow charts in FIGS. 9A, 9B, 9C and 10. In step S301, the status of the cartridge detection switch 12 is detected. If the cartridge 1 is loaded, and the ON state of the cartridge detection switch 12 is detected, it is checked if the movable light shielding door detection switch 10 is turned on (S302). After the cartridge 1 is loaded, when the cartridge cover is closed, and the operation button 27 is operated, the opening/closing device 26 causes the lock lever 25 to rotate in counter clockwise, and the lock pin 24 is locked by the lock lever 25, and the cartridge cover 22 is locked.

At the same time, rotation is transmitted to the driving member 7, and the movable light shilding door 4 is driven in the opening direction via the joint pawl 8 and the joint portion 3, and the movable light shielding door 4 is opened. When the movable light shielding door 4 is opened, the operation button 27 abuts against a stopper (not shown) and cannot be rotated any further.

When the movable light shielding door 4 is opened, the ON state of the movable light shielding door detection switch 10 is detected, the count operation of the timer counter T in the control circuit 100 is started (S303), and the motor driver 104 drives the film feeding motor 20 in a direction to feed out the film from the cartridge 1 (S304). Then, upon operation of the power transmission fork 13, the film 5 in the cartridge 1 comes out from the film opening where the movable light shielding door 4 is opened. The fork 13 and the spool 16 have different feeding speeds of the film 5 under the control of the power transmission means 19, so that the spool 16 has a higher feeding speed than that of the fork 13. In addition, since the fork 13 is provided with a unidirectional clutch, when the film 5 is wound around the spool 16, the film 5 is wound up by the spool 16.

On the other hand, it is checked if the value of the timer counter T exceeds a predetermined value $T_0$ (S305). Even if it is determined in step S305 that the value of the timer counter T exceeds the predetermined value $T_0$, if the film detection switch 11 cannot detect the film 5 in step S306, since the feed-out operation of the film 5 from the cartridge 1 is abnormal, the flow advances to step S321 to rewind the film. If the film detection switch 11 detects the film 5 (S306) before the value of the timer counter T exceeds the predetermined value $T_0$, the count operation of the timer counter T in the control circuit 100 is restarted (S307). It is then checked if the value of the timer counter T exceeds a predetermined value $T_1$ (S308). Even if it is determined in step S308 that the value of the timer counter T exceeds the predetermined value $T_1$, if the photoreflector 15 cannot detect any perforation of the film 5, since the auto-loading operation of the film 5 is abnormal, the flow advances to step S3 21 to rewind the film. If the photoreflector 15 detects a perforation of the first frame in step S309 before the value of the timer counter T exceeds the predetermined value $T_1$, the film feeding motor 20 is stopped by the motor driver 104 (S310). Thus, the feeding operation of the first frame of the film 5 ends.

It is then checked if the switch SW1 (109) is turned on upon operation of the release button (not shown) (S311). If the switch SW1 (109) is turned on, a distance measuring operation, photometry operation, and the like are performed by the other control circuit 102 (S312).

Furthermore, it is checked if the switch SW2 (110) is turned on upon depression of the release button (not shown) (S313). If the switch SW2 (110) is turned on, shutter (not shown) is opened by the other control circuit 102, and is closed after an elapse of a predetermined period of time (S314). The count operation of the timer counter T in the control circuit 100 is restarted (S315). The motor driver 104 drives the film feeding motor 20 to wind up the film by one frame (S316).

It is then checked if the value of the timer counter T exceeds a predetermined value $T_2$ (S317). If it is determined in step S317 that the value of the timer counter T exceeds the predetermined value since the film 5 can no longer be fed out from the cartridge 1 or some abnormality occurs, the flow advances to step S321 to rewind the film. If the photoreflector 15 detects by means of a perforation that the frame to be exposed on the film 5 has advanced by one frame in step S318 before the value of the timer counter T exceeds the predetermined value $T_2$, the motor driver 104 stops the film feeding motor 20, thus stopping the operation for winding up the film by one frame (S319).

It is then checked if the number of exposed frames reaches a predetermined value (S320). If it is determined in step S320 that the number of exposed frames has reached the predetermined value, it is determined that all frames on the film 5 are subjected to phototaking operations, and the flow advances to step S321. Otherwise, the flow advances to step S311 to wait for a phototaking operation. In step S321, the motor driver 104 rotates the film feeding motor 20 in the reverse direction to rotate the fork 13 in the reverse direction via the power transmission means 19, thereby rewinding the film 5 into the cartridge 1. Thereafter, the flow advances to step S322. At this time, the spool 16 is disconnected from the motor 20 by the clutch under the control of the power transmission means 19.

It is checked in step S322 if the film 5 is present at the position of the film detection switch 11. If no film 5 is detected by the switch 11, the flow advances to step S323, and the count operation of the timer counter T in the control circuit 100 is restarted.

It is then checked if the value of the timer counter T exceeds a predetermined value $T_3$ (S324). If it is determined in step S324 that the value of the timer counter T exceeds the predetermined value $T_3$, the flow advances to step S325. Note that the predetermined value $T_3$ defines a time long enough for the film 5 which has passed the position of the film detection switch 11 to be stored in the cartridge 1. Also, the predetermined value $T_3$ is changed depending on the voltage condition of the battery 101 or the environmental temperature of the camera, so as to prevent wasteful rotation of the motor 20.

Furthermore, it is checked in step S325 using the photoreflector 28 if the information indication apparatus 30 is black. If the information indication apparatus 30 is black, the motor driver 104 stops the film feeding motor 20 (S326). In this case, since the information indication apparatus 30 is fixed to the spool shaft 2, it stops while indicating the black portion, which indicates that the film has already been exposed. Thereafter, when the operation button 27 is operated, rotation is transmitted to the driving member 7 via the opening/closing device 26, thus moving the movable light shielding door 4 in the closing direction via the pawl 8 and the joint portion 3, and simultaneously rotating the lock lever 25 clockwise.

When the movable light shielding door 4 is closed, the operation button 27 abuts against a stopper (not shown), and cannot be rotated any further. At the same time, the lock lever 25 is unlocked from the lock pin 24, and the cartridge chamber cover 22 is unlocked. Then, the cartridge chamber cover 22 is opened by the biasing force of the spring (not shown).

On the other hand, when the operation button 27 is accidentally operated in the closing direction while the film 5 extends from the cartridge 1, the movable light shielding door 4 is closed, and damages the film. In this state, a phototaking operation is undesirably performed on the damaged portion of the film. Also, the cartridge chamber cover 22 is unlocked and opened, and light reaches and inadvertently exposes a normally exposed film portion or a non-exposed film portion in the cartridge 1 since the movable light shielding door 4 clamps the film 5 and is not completely closed. If a phototaking operation is performed in this state, the phototaking operation is undesirably performed on the film portion which has been accidentally exposed.

Figure 10:
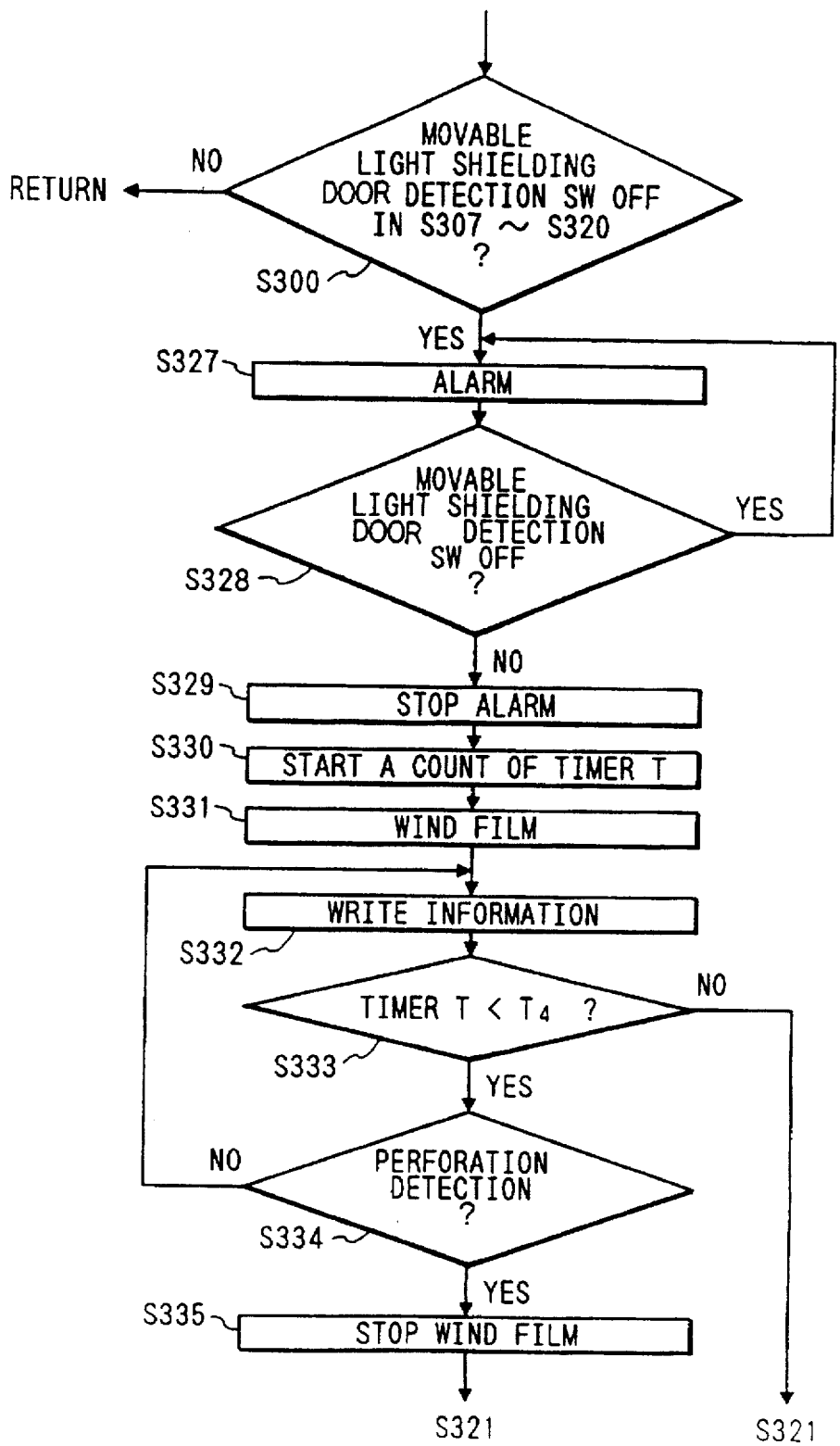
FIG. 10 is a flow chart showing an interrupt routine of the control circuit shown in FIG. 8.

For this reason, when the operation button 27 is accidentally operated to close the movable light shielding door 4, and the movable light shielding door detection switch 10 is turned off during an interval between steps S307 to S320, an interrupt routine shown in FIG. 10 is unconditionally executed (S300).

The interrupt routine will be described below with reference to the flow chart in FIG. 10. The indication portion 107 or the sound generator 108 warns a user of closing of the movable light shielding door 4 (S327). Thereafter, when the user closes the cartridge chamber cover 22, and operates the operation button 27, the lock lever 25 locks the lock pin 24 to lock the cartridge chamber cover 22, and the movable light shielding door 4 is opened to turn on the movable light shielding door detection switch 10 (S328). Then, the warning operation is stopped (S329). The count operation of the timer counter T in the control circuit 100 is restarted (S330), and the motor driver 104 drives the film feeding motor 20 to wind up the film (S331). The magnetic head control circuit 103 writes a print inhibition information signal on the magnetic recording portion of the film 5 using the magnetic head 14 (S332). Thus, upon printing, this print inhibition information signal is read to inhibit a film portion which is damaged by the movable light shielding door 4 or is accidentally exposed from being printed. In this manner, an unnecessary print operation can be avoided.

It is then checked if the value of the timer counter T exceeds a predetermined value $T_4$ (S333). If it is determined in step S332 that the value of the timer counter T exceeds the predetermined value $T_4$, since the film 5 can no longer be fed out from the cartridge 1 or some abnormality has occurred, the flow advances to step S321 to rewind the film.

On the other hand, if the photoreflector 15 detects that the film 5 is fed by a predetermined amount in step S333 before the value of the timer counter T exceeds the predetermined value $T_4$, the motor driver 104 stops the film feeding motor 20 (S335), and the flow advances to step S321 to rewind the film. Note that the predetermined amount corresponds to an amount required for writing magnetic information, and need not coincide with an amount for feeding the film by one frame.

With the processing shown in FIG. 10, even when the movable light shielding door 4 is closed while the film extends from the film cartridge, damaged the film, and is opened again later, the damaged film portion can be prevented from being used in a phototaking operation. Even when the cartridge chamber cover is opened by unlocking the cartridge chamber cover 22 while the film extends from the cartridge, and light accidentally reaches and exposes a normally exposed film portion or a non-exposed film portion in the cartridge since the movable light shielding door 4 clamps the film 5 and is not completely closed, the accidentally exposed film portion can be prevented from being used in a phototaking operation. Furthermore, an unnecessary print operation can be avoided.

Figure 11:
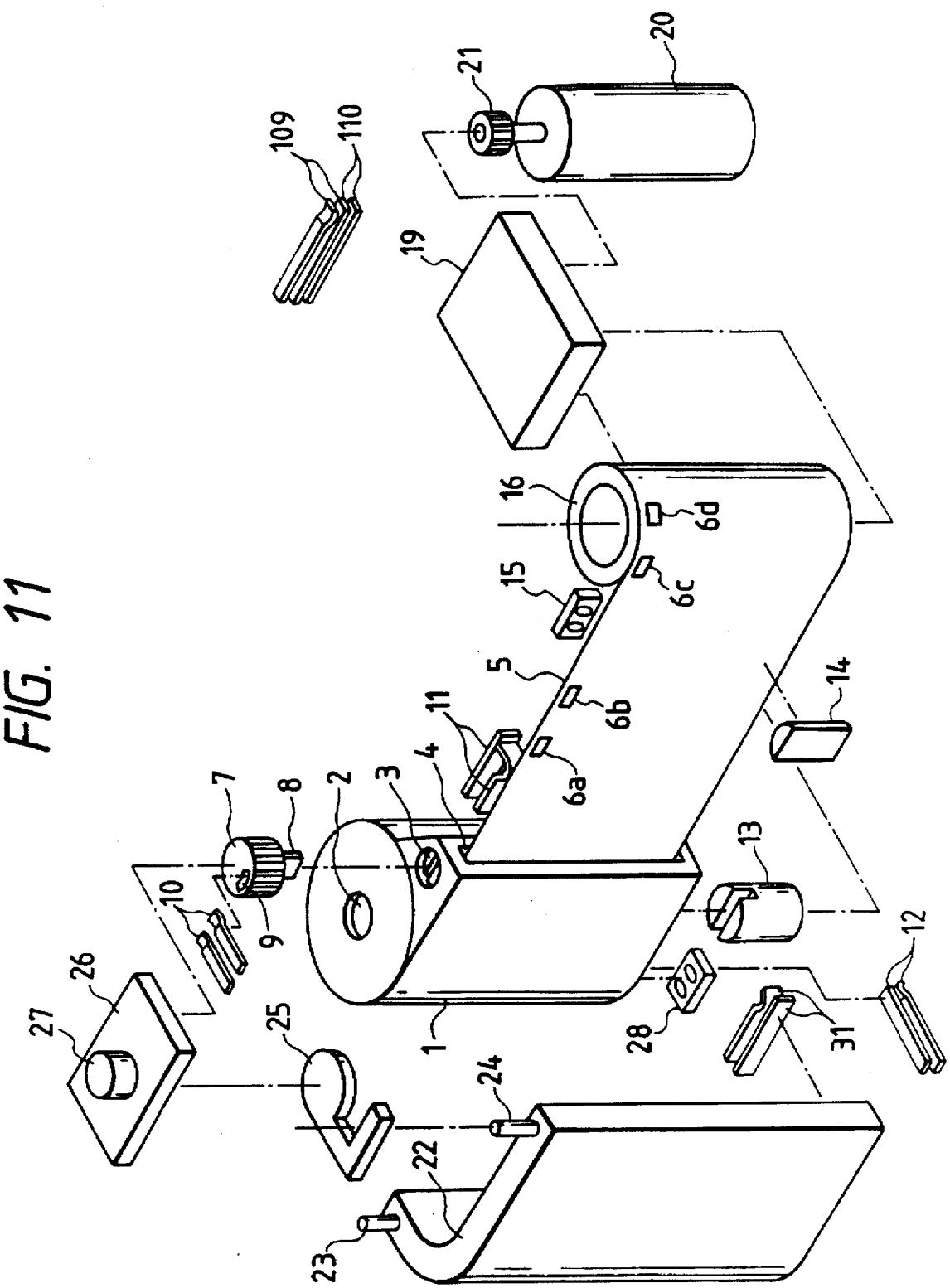
FIG. 11 is a schematic perspective view showing the arrangement of a principal part of a camera according to the third embodiment of the present invention.
Figure 12:
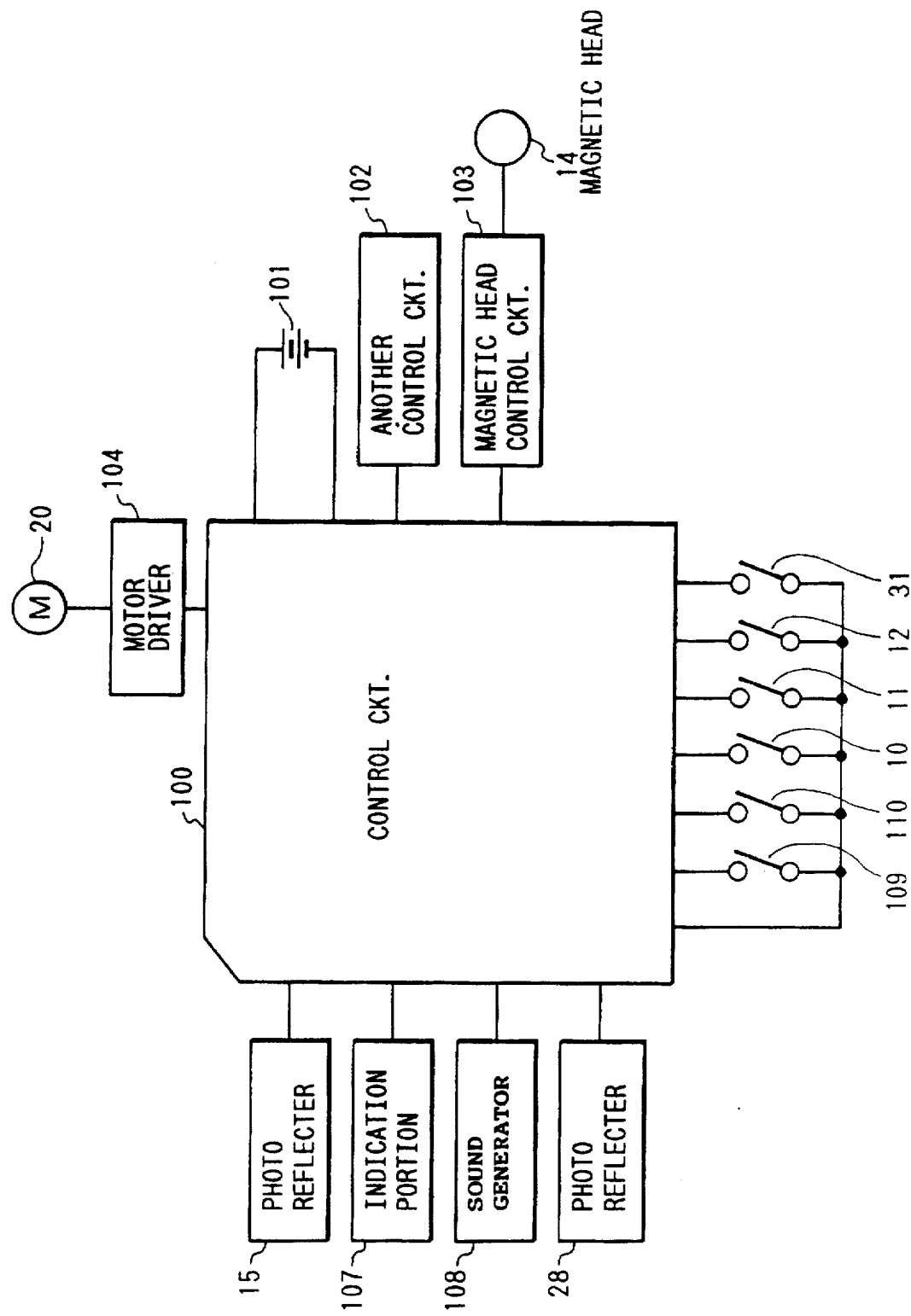
FIG. 12 is a block diagram of the camera shown in FIG. 11.
Figures 13, 13A:
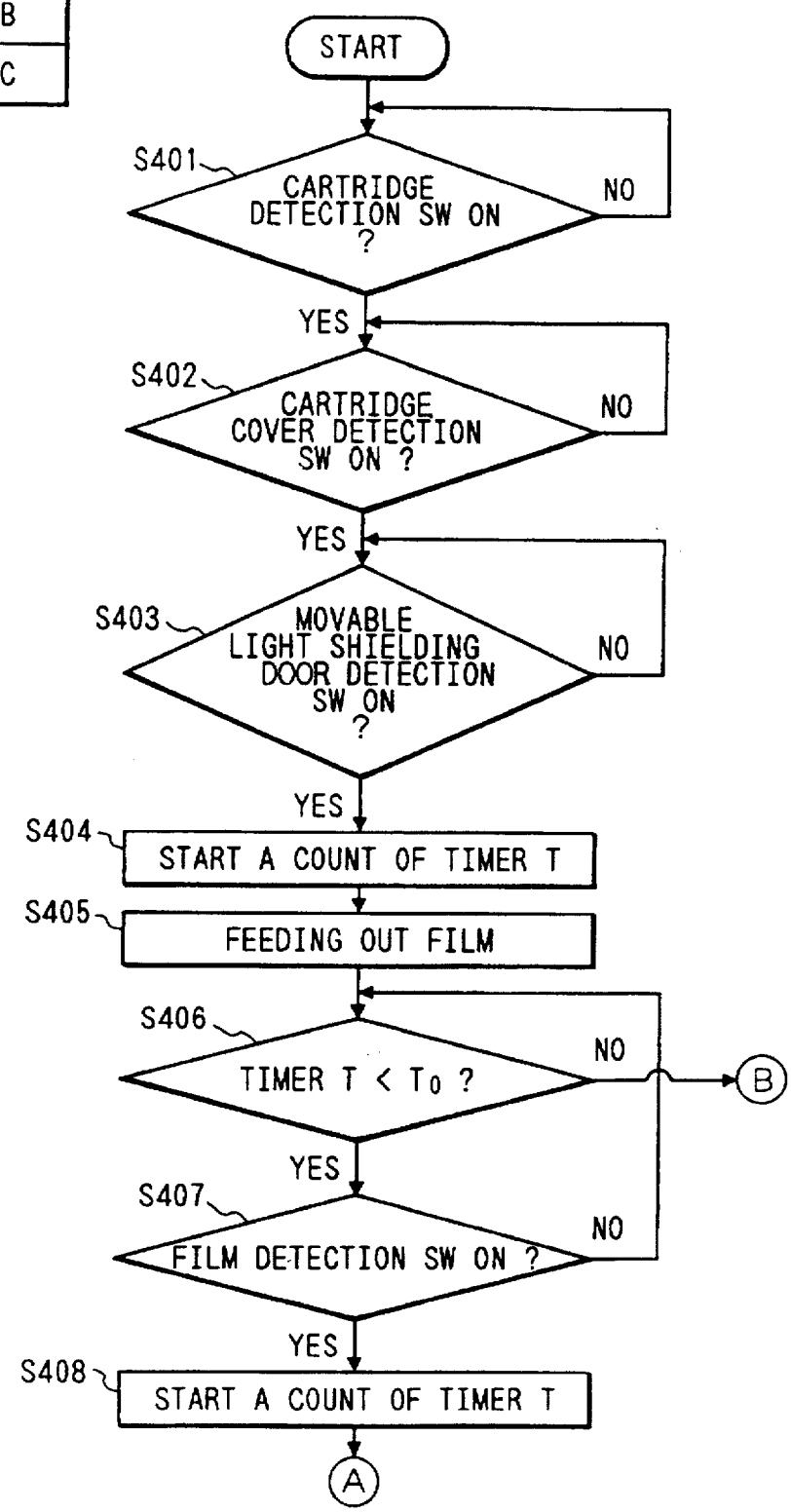
FIG. 13 is comprised of FIGS. 13A, 13B and 13C showing flow charts of a control circuit shown in FIG. 12.
Figure 13B:
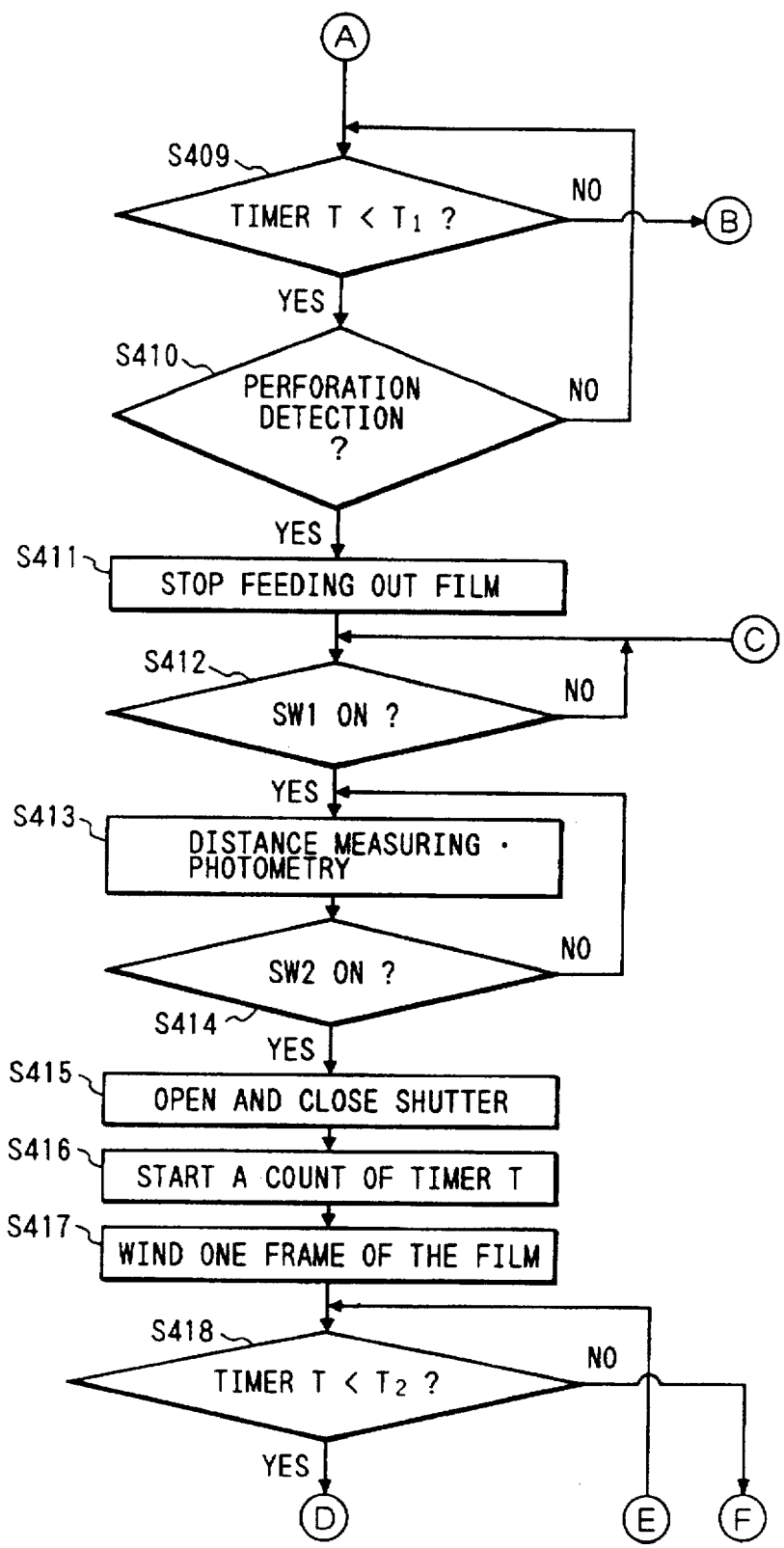
Figure 13C:
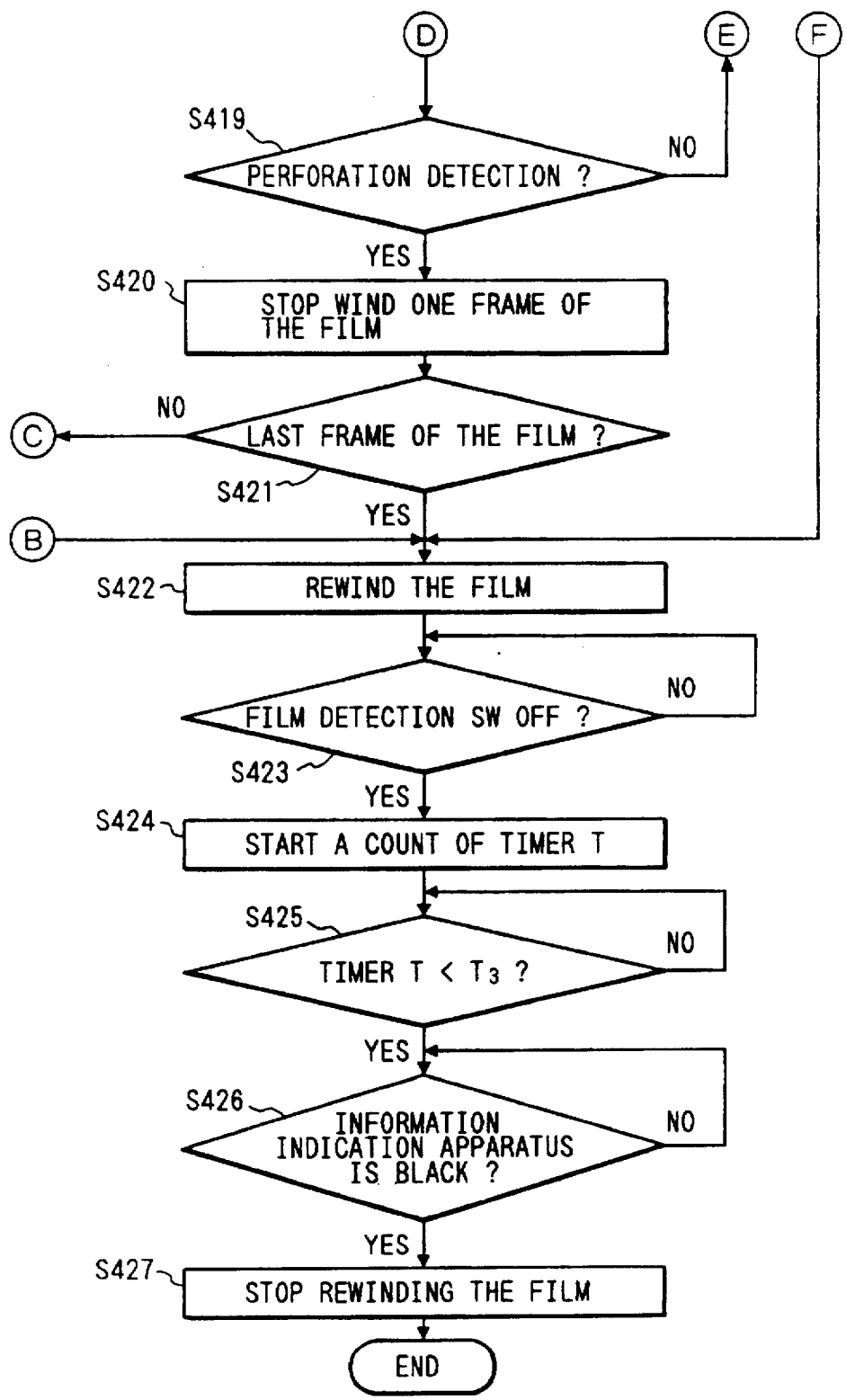

The third embodiment of the present invention will be described below with reference to FIGS. 11 to 14. FIG. 11 is a schematic perspective view showing the arrangement of a principal part of a camera. FIG. 12 is a block diagram of the camera shown in FIG. 11. FIGS. 13A, 13B, 13C and 14 are flow charts of a control circuit shown in FIG. 12. Note that the same reference numerals in these figures denote the same parts as in the first and second embodiments, and a detailed description thereof will be omitted.

Referring to FIG. 11, a cartridge chamber cover detection switch 31 is turned on when the cartridge chamber cover 22 is closed, and is turned off when the cover 22 is opened. In FIG. 11, the switch 31 is ON since the cartridge chamber cover 22 is closed.

The operation of this embodiment will be described below with reference to the flow charts in FIGS. 13A, 13B, 13C and 14. When the cartridge 1 is loaded, the cartridge detection switch 2 is turned on to detect this state (S401). When the cartridge chamber cover is closed, the cartridge chamber cover switch 31 is turned on to detect this state (S402). When the operation button 27 is operated, rotation is transmitted to the driving member 7 via the opening/closing device 26, thus driving the movable light shielding door 4 in the opening direction via the pawl 8 and the joint portion 3. At the same time, the lock pin 24 is locked by the lock lever 25, and the cartridge chamber cover 22 is locked. Simultaneously, the movable light shielding door 4 is opened by the driving member 7. Note that the operation button 27 abuts against a stopper (not shown) and cannot be rotated any further.

When the movable light shielding door 4 is opened, the ON state of the movable light shielding door detection switch 10 is detected (S403), and the count operation of the timer counter T in the control circuit 100 is started (S404).

The motor driver 104 then drives the film feeding motor 20 (S405). Then, upon operation of the power transmission fork 13, the film 5 in the cartridge 1 comes out from the film opening where the movable light shielding door 4 is opened. The fork 13 and the spool 16 have different feeding speeds of the film 5 under the control of the power transmission means 19, so that the spool 16 has a higher feeding speed than that of the fork 13. In addition, since the fork 13 is provided with a unidirectional clutch, when the film 5 is wound around the spool 16, the film 5 is wound up by the spool 16.

On the other hand, it is checked if the value of the timer counter T exceeds a predetermined value $T_0$ (S406). Even if it is determined in step S406 that the value of the timer counter T exceeds the predetermined value $T_0$, if the film detection switch 11 cannot detect the film 5 in step S407, since the feed-out operation of the film 5 from the cartridge 1 is abnormal, the flow advances to step S422 to rewind the film. If the film detection switch 11 detects the film 5 (S407) before the value of the timer counter T exceeds the predetermined value $T_0$, the count operation of the timer counter T in the control circuit 100 is restarted (S408). It is then checked if the value of the timer counter T exceeds a predetermined value $T_1$ (S409). If the photoreflector 15 cannot detect any perforation of the film 5 before the value of the timer counter T exceeds the predetermined value $T_1$, since the auto-loading operation of the film 5 is abnormal, the flow advances to step S422 to rewind the film.

If the photoreflector 15 detects a perforation of the first frame in step S410 before the value of the timer counter T exceeds the predetermined value $T_1$, the film feeding motor 20 is stopped by the motor driver 104 (S411). Thus, the feeding operation up to the first frame of the film 5 ends.

It is then checked if the switch SW1 (109) is turned on upon operation of the release button (not shown) (S412). If the switch SW1 (109) is turned on, a distance measuring operation, photometry operation, and the like are performed by the other control circuit 102 (S413).

Furthermore, it is checked if the switch SW2 (110) is turned on upon depression of the release button (not shown) (S414). If the switch SW2 (110) is turned on, a shutter (not shown) is opened by the other control circuit 102, and is closed after an elapse of a predetermined period of time (S415). The count operation of the timer counter T in the control circuit 100 is restarted (S416). The motor driver 104 drives the film feeding motor 20 to wind up the film by one frame (S417).

It is then checked if the value of the timer counter T exceeds a predetermined value $T_2$ (S418). If it is determined in step S418 that the value of the timer counter T exceeds the predetermined value $T_2$, since the film 5 can no longer be fed out from the cartridge 1 or some abnormality has occurred, the flow advances to step S422 to rewind the film. If the photoreflector 15 detects by means of a perforation that the frame to be exposed on the film 5 has advanced by one frame (S419) before the value of the timer counter T exceeds the predetermined value $T_2$, the motor driver 104 stops the film feeding motor 20, thus stopping the operation for winding up the film by one frame (S420).

It is then checked if the number of exposed frames reaches a predetermined value (S421). If it is determined in step S421 that the number of exposed frames has reached the predetermined value, it is determined that all the frames on the film 5 have been subjected to phototaking operations, and the flow advances to step S422. Otherwise, the flow advances to step S412 to wait for a phototaking operation.

In step S422, the motor driver 104 rotates the film feeding motor 20 in the reverse direction to rotate the fork 13 in the reverse direction via the power transmission means 19, thereby rewinding the film 5 into the cartridge 1. Thereafter, the flow advances to step S423. At this time, the spool 16 is disconnected from the motor 20 by the clutch under the control of the power transmission means 19.

It is checked in step S423 if the film 5 is present at the position of the film detection switch 11. If no film 5 is detected by the switch 11, the flow advances to step S424 to restart the count operation of the timer counter T in the control circuit 100. It is then checked if the value of the timer counter T exceeds a predetermined value $T_3$ (S425). If it is determined in step S425 that the value of the timer counter T exceeds the predetermined value $T_3$, the flow advances to step S426. Note that the predetermined value $T_3$ defines a time long enough for the film 5 which has passed the position of the film detection switch 11 to be stored in the cartridge 1. Also, the predetermined value $T_3$ is changed depending on the voltage condition of the battery 101 or the environmental temperature of the camera, so as to prevent wasteful rotation of the motor 20.

Furthermore, it is checked in step S426 using the photoreflector 28 if the information indication apparatus 30 is black. If the information indication apparatus 30 is black, the motor driver 104 stops the film feeding motor 20 (S427). In this case, since the information indication apparatus 30 is fixed to the spool shaft 2, it stops while indicating the black portion, which indicates that the film has already been exposed. Thereafter, when the operation button 27 is operated, rotation is transmitted to the driving member 7 via the opening/closing device 26, thus moving the movable light shielding door 4 in the closing direction via the pawl 8 and the joint portion 3, and simultaneously rotating the lock lever 25 clockwise.

When the movable light shielding door 4 is closed, the operation button 27 abuts against a stopper (not shown) and cannot be rotated any further. At the same time, the lock lever 25 is unlocked from the lock pin 24, and the cartridge chamber cover 22 is unlocked. Then, the cartridge chamber cover 22 is opened by the biasing force of the spring (not shown).

On the other hand, when the operation button 27 is accidentally operated in the closing direction while the film 5 extends from the cartridge 1, the movable light shielding door 4 is closed, and damages the film. In this state, a phototaking operation is undesirably performed on the damaged portion of the film. Also, the cartridge chamber cover 22 is unlocked and opened, and light reaches and unexpectedly exposes a normally exposed film portion or a non-exposed film portion in the cartridge 1 since the movable light shielding door 4 clamps the film 5 and is not completely closed. On the other hand, when the cartridge chamber cover 22 is not opened, as in a case wherein the operation button is operated while pressing the cartridge chamber cover 22 by the hand, film can be prevented from being accidentally exposed unlike in the above-mentioned case.

Figure 14:
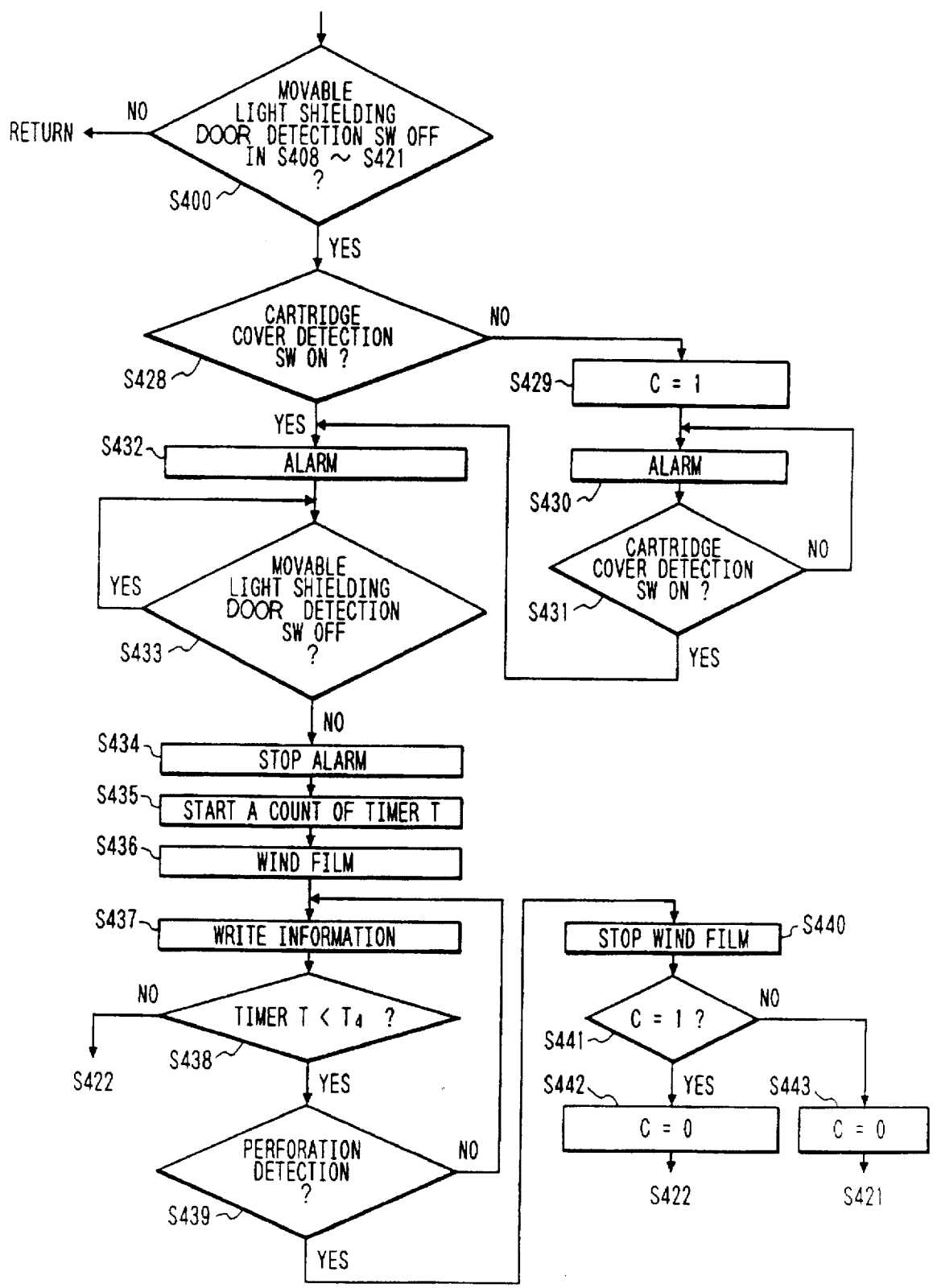
FIG. 14 is a flow chart showing an interrupt routine of the control circuit shown in FIG. 12.

For this reason, when the operation button 27 is accidentally operated to close the movable light shielding door 4, and the movable light shielding door detection switch 10 is turned off during an interval between steps S408 to S421, an interrupt routine shown in FIG. 14 is unconditionally executed (S400). This interrupt routine will be described below with reference to the flow chart in FIG. 14.

The status of the cartridge chamber cover detection switch 31 is detected (S428). If the switch 31 is OFF (the cartridge chamber cover is closed), the flow advances to step S429; if the switch 31 is ON (the cartridge chamber cover is open), the flow advances to step S432.

If the switch 31 is OFF, and the flow advances to step S429, "1" is set in a parameter C in the control circuit. Then, the indication portion 107 or the sound generator 108 warns a user of opening of the cartridge chamber cover 22 (S430). Thereafter, when the user closes the cartridge chamber cover 22 and the ON state of the cartridge chamber cover detection switch 31 is detected (S431), the indication portion 107 or the syund generator 108 warns the user of the closing of the movable light shielding door 4 (S432). When the operation button 27 is operated and the lock lever 25 locks the lock pin 24 to lock the cartridge chamber cover 22 to simultaneously open the movable light shielding door 4, the movable light shielding door detection switch 10 is turned on. Upon detection of 5 the ON state of the switch 10 (S433), the warning operation is stopped (S434). Then, the count operation of the timer counter T in the control circuit 100 is restarted (S435), and the motor driver 104 drives the film feeding motor 20 to wind up the film (S436). The magnetic head control circuit 103 writes, using the magnetic head 14, a print inhibition information signal on magnetic information portions of all the frames after the current frame if C=1 or on a magnetic information portion of only the current frame if C≠1 of the film 5 (S437). Thus, upon printing, this print inhibition information signal is read to inhibit a film portion which is damaged by the movable light shielding door 4 or is accidentally exposed from being printed. In this manner, an unnecessary print operation can be avoided.

It is then checked if the value of the timer counter T exceeds a predetermined value $T_4$ (S438). If it is determined in step S438 that the value of the timer counter T exceeds the predetermined value $T_4$, since the film 5 can no longer be fed out from the cartridge 1 or some abnormality has occurred, the flow advances to step S422 to rewind the film. On the other hand, if the photoreflector 15 detects in step S439 that the film 5 is fed by a predetermined amount before the value of the timer counter T exceeds the predetermined value $T_4$, the motor driver 104 stops the film feeding motor 20 (S440). Note that the predetermined amount corresponds to a larger one of an amount required for writing magnetic information and an amount required for moving the portion, damaged by the movable light shielding door 4, of the film to prevent the portion from being used in a phototaking operation independently of the aperture of the camera (not shown), and need not coincide with an amount for feeding the film by one frame.

If it is determined in step S441 that C=1 (cartridge chamber cover 22 is opened), C is cleared (S442), and the flow advances to step S422 to rewind the film. On the other hand, if it is determined in step S441 that C≠1 (cartridge chamber cover 22 is not opened), C is cleared (S443), and the flow advances to step S421 to continue a phototaking operation.

As described above, even when the movable light shielding door is closed while the film extends from the film cartridge, damaging the film, and is opened again later, the damaged film portion can be prevented from being used in a phototaking operation. Even when the cartridge chamber cover is opened by unlocking the cartridge chamber cover 22 while the film extends from the cartridge, and light accidentally reaches and exposes a normally exposed film portion or a non-exposed film portion in the cartridge since the movable light shielding door 4 clamps the film 5 and is not completely closed, the accidentally exposed film portion can be prevented from being used in a phototaking operation. Furthermore, an unnecessary print operation can be avoided.

Note that the present invention may be achieved by combining the above-mentioned embodiments or their technical elements, as needed.

The present invention can be applied to a camera which uses a cartridge having a movable light shielding door or the like different from that in the present specification.

In the present invention, a film may be fed by one frame by either a winding or rewinding operation.

The present invention can be applied to a camera which uses an image recording medium other than a film.

The present invention can be applied to a camera which uses a cartridge different from that used in the present specification, a cartridge having an image recording medium other than a film, other types of cartridges, or a member to be loaded other than a cartridge.

The present invention can be applied to various types of cameras such as a single-lens reflex camera, a lens-shutter camera, a video camera, and the like, optical equipment other than cameras or other devices, and units applied to these cameras, optical equipment, and other devices.

The individual components shown in schematic or block form in the drawing are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted to an image recording medium cartridge having a cover for allowing an image recording medium to exit from or withdraw into the image recording medium cartridge, said apparatus comprising:

a controller that determines at least one of a state wherein the cover of a cartridge loaded in a cartridge chamber of the apparatus allows entrance of light into the cartridge on the basis of a detected opening of the cover of the cartridge and a cover of the cartridge chamber, and a state wherein the cover of the cartridge clamps the image recording medium on the basis of a detected closing of the cover of the cartridge when a portion of the image recording medium is extruded from the cartridge; and which performs at least one of regulating recording of an image on the image recording medium and recording of information on the image recording medium which is subsequently usable for regulating printing of an image recorded on the image recording medium in accordance with a determination result of said controller.

2. An apparatus according to claim 1, wherein the image recording medium comprises a film.

3. An apparatus according to claim 1, wherein said controller comprises means for detecting opening/closing of the cover of the cartridge.

4. An apparatus according to claim 1, wherein said controller comprises means for determining a state of the cover of the cartridge, and for determining whether the image recording medium is in a state wherein the cover of the cartridge clamps the image recording medium.

5. An apparatus according to claim 1, wherein said controller comprises means for determining a state of the cover of the cartridge, for determining whether the image recording medium is in a state wherein the cover of the cartridge clamps the image recording medium, and for determining a state of the cover of the cartridge chamber.

6. An apparatus according to claim 1, wherein said controller comprises means for determining a state of the cover of the cartridge, and a state of a cover of the cartridge chamber.

7. An apparatus according to claim 1, wherein said determination means comprises means for determining whether the image recording medium is in a state wherein the cover of the cartridge clamps the image recording medium, and for determining a state of a cover of the cartridge chamber.

8. An apparatus according to claim 1, wherein said controller comprises means for inhibiting at least one of recording of an image on the image recording medium and subsequent printing of an image recorded on the image recording medium.

9. An apparatus according to claim 1, wherein said controller comprises means for preventing at least a portion of the image recording medium clamped by the cover of the cartridge from being used in image recording.

10. An apparatus according to claim 1, wherein said controller comprises means for preventing a portion of the image recording medium clamped by the cover of the cartridge from being used in image recording.

11. An apparatus according to claim 1, wherein said controller comprises means for moving the image recording medium so as to prevent at least a portion of the image recording medium clamped by the cover of the cartridge from being used in image recording.

12. An apparatus according to claim 1, wherein said controller comprises means for inhibiting image recording on the image recording medium after said controller determines that the cover of the cartridge allows entrance of light into the cartridge.

13. An apparatus according to claim 1, wherein said controller comprises means for moving the image recording medium so as to inhibit image recording on the image recording medium after said controller determines that the cover of the cartridge allows entrance of light into the cartridge.

14. An apparatus according to claim 1, wherein said controller comprises means for inhibiting at least a portion of the image recording medium clamped by the cover of the cartridge from being used in a print operation.

15. An apparatus according to claim 1, wherein said controller comprises means for inhibiting a portion of the image recording medium clamped by the cover of the cartridge from being used in a print operation.

16. An apparatus according to claim 1, wherein said controller comprises means for recording information indicating an instruction for inhibiting at least a portion of the image recording medium from being used in a print operation.

17. An apparatus according to claim 1, wherein said controller comprises means for inhibiting at least a portion of the image recording medium from being used in a print operation, when said controller determines that the cover of the cartridge allows entrance of light into the cartridge.

18. An apparatus according to claim 1, wherein said controller comprises means for recording information indicating an instruction for inhibiting at least a portion of the image recording medium from being used in a print operation, when said controller determines that the cover of the cartridge allows entrance of light into the 19. An apparatus according to claim 1, further comprising:
means for setting the cartridge in a used state when said controller determines that the cover of the cartridge allows entrance of light into the cartridge.

20. An apparatus according to claim 1, further comprising:
means for causing the cartridge to indicate a used state when said controller determines that the cover of the cartridge allows entrance of light into the cartridge.

21. An apparatus according to claim 1, further comprising:
means for generating a warning in accordance with determination result of said controller.

22. An apparatus according to claim 1, further comprising:
means for causing the apparatus to perform different operations in accordance with a determination result of said controller.

23. An apparatus according to claim 1, further comprising:
means for stopping a movement of the image recording medium in accordance with a determination result of said controller.

24. An apparatus according to claim 1, wherein said apparatus comprises a camera.

25. An apparatus adapted to an image recording medium cartridge having a light shield portion, said apparatus comprising:
a controller that determines at least one of a state wherein the light shield portion of a cartridge loaded in a cartridge chamber of the apparatus allows entrance of light into the cartridge on the basis of a detected opening of the light shield and a cover of the cartridge chamber of the apparatus, and a state wherein the light shield portion of the cartridge clamps the image recording medium on the basis of a detected closing of the light shield when a portion of the image recording medium is extruded from the cartridge; and which performs
at least one of regulating recording of an image on the image recording medium and recording of information on the image recording medium which is subsequently usable for regulating printing of an image recorded on the image recording medium in accordance with a determination result of said controller.

26. An apparatus according to claim 25, wherein said apparatus comprises a camera.

* * * * *

UNITED STATES PATENT AND TRADEMARK OFFICE
CERTIFICATE OF CORRECTION

PATENT NO. : 5,675,834
DATED : October 7, 1997
INVENTOR(S) : TETSUYA NISHIO

It is certified that error appears in the above-identified patent and that said Letters Patent is hereby corrected as shown below:

At [57] ABSTRACT

Lines 4 and 5, "determination means" should read --a determination device--.

Line 9, "regulating means" should read --a regulating device--.

Line 13, "determination means" should read --determination device--.

Column 3

Line 39, "0N" should read --ON--.

Column 5

Line 8, delete "the" (first occurrence).
Line 20, "delete "due to the".

Column 6

Line 39, delete "due".

UNITED STATES PATENT AND TRADEMARK OFFICE
CERTIFICATE OF CORRECTION

PATENT NO. : 5,675,834                    Page 2 of 3

DATED : October 7, 1997

INVENTOR(S) :
TETSUYA NISHIO

It is certified that error appears in the above-identified patent and that said Letters Patent is hereby corrected as shown below:

Column 7

Line 33, "0N" should read --ON--.
    Line 38 and 39, "in counter clockwise" should read --counterclockwise--.
    Line 42, "shilding" should read --shielding--.

Column 8

Line 14, "S3 21" should read --S321--.
    Line 27, "on," should read --on, a--.
    Line 37, "value" should read --value $T_2$,--.

Column 10

Line 21, "damaged" should read --damaging--.
    Line 46, "0N" should read --ON--.
    Line 51, "2" should read --12--.

Column 12

Line 54, "0n" should read --On--.
    Line 57, delete "the".
    after "hand" insert --the--.

UNITED STATES PATENT AND TRADEMARK OFFICE
CERTIFICATE OF CORRECTION

PATENT NO.   : 5,675,834                           Page 3 of 3
DATED        : October 7, 1997
INVENTOR(S)  : TETSUYA NISHIO It is certified that error appears in the above-identified patent and that said Letters Patent is hereby corrected as shown below:

<u>Column 13</u>

Line 10, "syund" should read --sound--.

<u>Column 14</u>

Lines 52 and 53, delete "which is subsequently usable".

<u>Column 15</u>

Line 10, "determination means" should read --controller--.

<u>Column 16</u>

Line 8, "into the" should read --into the cartridge.--
    Line 21, "with" should read --with a--.

Signed and Sealed this

Seventh Day of July, 1998

Attest:

BRUCE LEHMAN

*Attesting Officer*    *Commissioner of Patents and Trademarks*